(12) United States Patent
Urrutia et al.

(10) Patent No.: US 12,539,074 B2
(45) Date of Patent: Feb. 3, 2026

(54) VITAL SIGNS MONITOR HAVING USER CONFIGURABLE MACHINE LEARNED PATIENT DETERIORATION MODEL

(71) Applicant: Welch Allyn, Inc., Skaneateles Falls, NY (US)

(72) Inventors: Eugene Urrutia, Apex, NC (US); Corrie A. Baum, Skaneateles, NY (US); Chiew Yuan Chung, Singapore (SG); Waqaar Khawar, Raleigh, NC (US); Christopher L. Long, Chittenango, NY (US); Kathryn Piston, Syracuse, NY (US); Kristin A. Russell, Syracuse, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 273 days.

(21) Appl. No.: 18/326,501

(22) Filed: May 31, 2023

(65) Prior Publication Data

US 2024/0000371 A1 Jan. 4, 2024

Related U.S. Application Data

(60) Provisional application No. 63/357,038, filed on Jun. 30, 2022.

(51) Int. Cl.
| | |
|---|---|
| *A61B 5/00* | (2006.01) |
| *A61B 5/0205* | (2006.01) |
| *G16H 10/60* | (2018.01) |
| *G16H 50/30* | (2018.01) |
| *A61B 5/024* | (2006.01) |
| *A61B 5/08* | (2006.01) |

(52) U.S. Cl.
CPC .......... *A61B 5/412* (2013.01); *A61B 5/02055* (2013.01); *A61B 5/7221* (2013.01); *A61B 5/7275* (2013.01); *G16H 10/60* (2018.01); *G16H 50/30* (2018.01); *A61B 5/024* (2013.01); *A61B 5/0816* (2013.01); *A61B 5/742* (2013.01)

(58) Field of Classification Search
None
See application file for complete search history.

(56) References Cited

U.S. PATENT DOCUMENTS

| | | |
|---|---|---|
| 2008/0052318 A1 | 2/2008 | Iliff |
| 2011/0112442 A1 | 5/2011 | Meger et al. |
| 2014/0005502 A1 | 1/2014 | Klap et al. |

(Continued)

FOREIGN PATENT DOCUMENTS

| | | |
|---|---|---|
| CN | 111261282 A | 6/2020 |
| WO | 2019025901 A1 | 7/2018 |
| WO | 2021035098 A2 | 2/2021 |

OTHER PUBLICATIONS

PCT Application No. PCT/US2023/024089, Search Report and Written Opinion dated Aug. 22, 2023, 20 pages.

(Continued)

*Primary Examiner* — Ankit D Tejani
(74) *Attorney, Agent, or Firm* — Barnes & Thornburg LLP

(57) ABSTRACT

A vital signs monitor for detecting sepsis in a patient includes a housing. At least one vital sign sensor is coupled to the housing and is configured to obtain at least one vital sign from a patient. A display is positioned on an outer surface of the housing. A controller is embedded in the housing and is operable to receive a vital sign signal from the at least one vital sign sensor.

20 Claims, 23 Drawing Sheets

(56) References Cited

U.S. PATENT DOCUMENTS

| | | |
|---|---|---|
| 2016/0364537 A1 | 12/2016 | Das et al. |
| 2020/0176117 A1 | 6/2020 | Lee et al. |
| 2020/0312453 A1 | 10/2020 | Risnen et al. |
| 2021/0022660 A1 | 1/2021 | Quinn et al. |
| 2021/0052218 A1 | 2/2021 | Quinn et al. |
| 2021/0057111 A1 | 2/2021 | Barkol et al. |
| 2021/0068768 A1 | 3/2021 | Al-Ali et al. |
| 2021/0251575 A1 | 8/2021 | Ong et al. |
| 2021/0350933 A1 | 11/2021 | Noren et al. |
| 2021/0358619 A1 | 11/2021 | Vu et al. |
| 2022/0202350 A1 | 6/2022 | Sandgaard et al. |

OTHER PUBLICATIONS

Extended European Search Report issued for European Patent Application No. 23832112.9; dated Sep. 8, 2025; 13 pages.

| SELECTED TEXT FROM DISCHARGE SUMMARY | TEMP | HEART RATE | SYSTOLIC BP | DIASTOLIC BP | RESP RATE | SpO2 | SUPP Ox |
|---|---|---|---|---|---|---|---|
| ED: THE PATIENT THROUGH TO BE ILL APPEARING AND "DRY". HIS VITAL SIGNS TEMP 100.0, HR 107, BP 120/80's, RR 24, Sa 96% 2LNC. EKG unc | 100.0 | 107 | 120 | 80 | 24 | 96 | TRUE |
| ED, 99.4 115/69 120 17 100%RA. WHILE | 99.4 | 120 | 115 | 69 | 17 | 100 | FALSE |
| ED VS INITIALLY SHOWED T 96.7 BP 149/84 HR 89 RR 28-48 O2\nsat 97% ON RA. CXR sh | 96.7 | 89 | 149 | 84 | 38 | 97 | FALSE |

*FIG. 8*

| METRIC | % MISSING VALUES |
|---|---|
| TEMPERATURE | 0% |
| HEART RATE | 0% |
| SYSTOLIC BP | 0% |
| DIASTOLIC BP | 0% |
| RESPIRATORY RATE | 0% |
| OXYGEN SATURATION | 0% |
| WBC | 0% |
| BANDS | 58% |
| PaCO2 | 43% |
| TIME TO MICROBIAL | 9% |
| TIME TO ICU | 0% |
| MORTALITY | 0% |

*FIG. 9*

| DESCRIPTION | ICD-9 CODE | COUNT |
|---|---|---|
| SEVERE SEPSIS | 995.91 | 516 |
| SEPTIC SHOCK | 995.92 | 336 |
| SEPSIS | 785.52 | 169 |

*FIG. 10*

|  | OVERALL | NON-SEPTIC | SEPTIC | ICD9 CODE DEFINITION | | |
|---|---|---|---|---|---|---|
|  |  |  |  | SEPSIS | SEVERE SEPSIS | SEPTIC SHOCK |
| N (total #) | 3871 | 3179 | 692 | 169 | 516 | 336 |
| TEMPERATURE (°F) | 98.3 | 98.2 | 99.3 | 99.5 | 99.2 | 99.3 |
| HEART RATE (bpm) | 94 | 92 | 100 | 100 | 100 | 100 |
| NONINVASIVE SYSTOLIC BP (mmHg) | 126 | 129 | 110 | 114 | 108 | 106 |
| NONINVASIVE DIASTOLIC BP (mmHg) | 70 | 72 | 60 | 62 | 60 | 60 |
| RESPIRATORY RATE (breaths / min) | 18 | 18 | 20 | 19 | 20 | 20 |
| OXYGEN SATURATION (%) | 98% | 98% | 97% | 97% | 97% | 97% |
| WBC ($10^3/\mu L$) | 9.8 | 9.35 | 12.4 | 12.1 | 12.5 | 12.7 |
| BANDS (%) | 0 | 0 | 2 | 1 | 2 | 2 |
| PaCO2 (mmHg) | 26 | 26 | 23 | 24 | 23 | 23 |
| TIME TO MICROBIAL (hr) | 1.6 | 2.4 | 0.6 | 0.6 | 0.6 | 0.5 |
| TIME TO ICU (hr) | 4.1 | 4.1 | 4.1 | 4.3 | 4.1 | 4 |
| MORTALITY (%) | 10.30% | 7.10% | 24.70% | 10.10% | 29.70% | 30.10% |

FIG. 23

| | Sensitivity (TPR) | SPECIFICITY (1-FPR) | F1 SCORE | PPV | NPV | TRUE POSITIVE | FALSE NEGATIVE | TRUE NEGATIVE | FALSE POSITIVE |
|---|---|---|---|---|---|---|---|---|---|
| SIRS >=2 | 71% | 56% | 0.38 | 26% | 90% | 494 | 198 | 1786 | 1393 |
| ED MODEL (EQUAL SPECIFICITY) | 83% | 56% | 0.43 | 29% | 94% | 577 | 115 | 1789 | 1390 |
| ED MODEL (BALANCED) | 78% | 64% | 0.45 | 32% | 93% | 539 | 153 | 2045 | 1134 |
| ED MODEL (EQUAL SENSITIVITY) | 71% | 71% | 0.47 | 35% | 92% | 494 | 198 | 2250 | 929 |

*FIG. 26*

| | TEMPERATURE (F) | HEART RATE (bpm) | SYSTOLIC BP (mmHg) | DIASTOLIC BP (mmHg) | RESPIRATORY RATE (breaths / min) | OXYGEN SATURATION (%) |
|---|---|---|---|---|---|---|
| NEW CASES IDENTIFIED | 98.3 | 82 | 101 | 56 | 18 | 98 |
| AVOIDED FALSE ALARMS | 98.0 | 103 | 141 | 82 | 22 | 98 |

*FIG. 27*

|  |  | SENSITIVITY (TPR) | SPECIFICITY (1-FPR) | N ADMISSIONS |
|---|---|---|---|---|
| OVERALL |  | 78% | 64% | 3871 |
| GENDER | MALE | 79% | 66% | 2047 |
|  | FEMALE | 76% | 62% | 1824 |
| ETHNICITY | WHITE | 78% | 63% | 2800 |
|  | AFRICAN AMERICAN | 75% | 68% | 642 |
|  | ASIAN | 96% | 74% | 105 |
|  | HISPANIC | 79% | 70% | 166 |
|  | UNKNOWN | 75% | 67% | 140 |
|  | MULTI | 67% | 25% | 11 |
|  | MIDDLE EASTERN | 100% | 33% | 4 |
| AGE (YEARS) | 16-39 | 73% | 69% | 414 |
|  | 40-59 | 80% | 64% | 1087 |
|  | 60-80 | 78% | 63% | 1474 |
|  | 80-100 | 78% | 63% | 981 |

FIG. 34

| | OVERALL | NON-SEPTIC | SEPTIC | SEPSIS | SEVERE SEPSIS | SEPTIC SHOCK | SEPTIC OTHER | PERCENT MISSING |
|---|---|---|---|---|---|---|---|---|
| N (TOTAL #) | 413309 | 403591 | 9718 | 5828 | 2822 | 2899 | 6013 | |
| TEMPERATURE (F) | 98 | 98 | 98.6 | 98.6 | 98.6 | 98.3 | 98.6 | 0 |
| HEART RATE (bpm) | 84 | 83 | 99 | 100 | 99 | 98 | 98 | 0 |
| RESPIRATORY RATE (BREATHS/min) | 18 | 18 | 18 | 18 | 18 | 18 | 18 | 0 |
| OXYGEN SATURATION (%) | 99 | 99 | 98 | 97 | 97 | 97 | 98 | 0 |
| NONINVASIVE SYSTOLIC BP (mmhg) | 133 | 133 | 120 | 120 | 118 | 110 | 119 | 0 |
| NONINVASIVE DIASTOLIC BP (mmhg) | 77 | 77 | 68 | 68 | 66 | 63 | 67 | 0 |
| WBC ($10^{\wedge}3$/ul) | 8.1 | 8 | 12.7 | 13 | 12.8 | 12.4 | 12.5 | 33.8 |
| BANDS (%) | 0 | 0 | 3 | 3 | 4 | 5 | 3 | 96.2 |
| PACO2 (mmhg) | 42 | 42 | 40 | 41 | 40 | 40 | 39 | 97 |
| TIME TO ANTIBIOTICS-PYXIS (HRS) | 3.5 | 3.6 | 2.5 | 2.5 | 2.1 | 1.9 | 2.2 | 86.3 |
| TIME TO MICROBIAL CULTURE (HRS) | 1.9 | 2.0 | 0.9 | 0.8 | 0.7 | 0.6 | 0.8 | 54.2 |

FIG. 47

| | OVERALL | NON-SEPTIC | SEPTIC | SEPSIS | SEVERE SEPSIS | SEPTIC SHOCK | SEPTIC OTHER |
|---|---|---|---|---|---|---|---|
| N | 413309 | 403591 | 9718 | 5828 | 2822 | 2899 | 6013 |
| MORTALITY (%) | 1.5 | 0.9 | 11.8 | 11.0 | 15.3 | 26.9 | 10.8 |
| TIME TO MORTALITY (HRS) | | | | | | | |
| ADMITTED TO HOSPITAL (%) | 46.1 | 44.8 | 99.7 | 99.5 | 99.8 | 99.9 | 100.0 |
| TIME TO HOSPITAL ADMISSION (HRS) | 5.0 | 5.0 | 4.8 | 4.9 | 4.4 | 4.3 | 4.5 |
| HOSPITAL TOTAL LOS (DAYS) | 2.4 | 2.1 | 6.9 | 6.4 | 7.0 | 9.1 | 6.9 |
| ADMITTED TO ICU (%) | 5.5 | 4.4 | 52.7 | 50.1 | 65.2 | 94.9 | 54.3 |
| TIME TO ICU TRANSFER (HRS) | 7.0 | 7.0 | 6.9 | 6.8 | 6.4 | 6.8 | 6.6 |
| ICU TOTAL LOS (DAYS) | 1.9 | 1.8 | 2.5 | 2.4 | 2.6 | 3.2 | 2.4 |

FIG. 48

| | LABEL | N | RATE | MEDIAN MINUTES | WITHIN 1 HOURS | WITHIN 4 HOURS |
|---|---|---|---|---|---|---|
| 0 | VITALS TAKEN | 6147 | 0.63 | 1 | 1.00 | 1.00 |
| 1 | WBC DRAW | 9137 | 0.94 | 44 | 0.62 | 1.00 |
| 2 | WBC RESULT | 9137 | 0.94 | 80 | 0.32 | 0.98 |
| 3 | LACTATE DRAW | 8075 | 0.83 | 56 | 0.54 | 1.00 |
| 4 | LACTATE RESULT | 8075 | 0.83 | 59 | 0.51 | 1.00 |
| 5 | CULTURE DRAW | 9650 | 0.99 | 51 | 0.52 | 0.85 |
| 6 | CULTURE RESULT | 9650 | 0.99 | 5.5 DAYS | 0.00 | 0.00 |
| 7 | ABNTIBIOTIC ADMINISTRATION | 8536 | 0.88 | 208 | 0.14 | 0.55 |
| 8 | ABNTIBIOTIC ADMINISTRATION (PYXIS) | 4834 | 0.50 | 147 | 0.20 | 0.73 |
| 9 | ABNTIBIOTIC ADMINISTRATION (EMAR) | 7116 | 0.73 | 262 | 0.09 | 0.47 |

FIG. 49

VITAL SIGNS MONITOR HAVING USER CONFIGURABLE MACHINE LEARNED PATIENT DETERIORATION MODEL

CROSS-REFERENCE TO RELATED APPLICATIONS

This application claims priority under 35 U.S.C. § 119(e) to U.S. Provisional Application No. 63/357,038, filed Jun. 30, 2022, which is expressly incorporated by reference herein.

BACKGROUND

The present disclosure relates to vital signs monitors and, more particularly, to a vital signs monitor for detecting sepsis.

Sepsis is a life-threatening, time sensitive, organ dysfunction whose clinical presentation is often subtle and nonspecific. Sepsis, the leading cause of death in US hospitals and contributes up to 20% of deaths worldwide, is a time-critical medical emergency. Up to 85% of septic hospital patients have sepsis upon admission optimal time of intervention is at emergency department triage. Sepsis is a life-threatening organ dysfunction due to dysregulated host response to infection. In the United States alone, sepsis leads to 270,000 deaths and contributes up to 20% of deaths worldwide. Sepsis is the number one cause of death within hospital patients.

The emergency department represents the earliest point of contact for most sepsis cases. Studies have shown that up to 85% of septic hospital patients have sepsis upon admission compared to only 15% acquiring sepsis later during their stay. Sepsis is a time-critical medical emergency, thus, the opportune time to intervene at the hospital would naturally be at emergency department triage. For a majority of patients, emergency department triage presents the earliest opportunity to screen for sepsis. In 2017, an estimated 48.9 million cases of sepsis were recorded worldwide and 11.0 million sepsis-related deaths were reported, representing 19.7% of all global deaths. For every hour delay in administration of antibiotics, mortality increases by 4%.

Routine screening is recommended to increase the early identification of sepsis, but there is no guidance of what routine screening means or how it should be implemented. In present practice, early warning scores are used to screen for sepsis and other deterioration events in the emergency department. Tools like the Systemic Inflammatory Response Syndrome (SIRS) score or the quick Sequential Organ Failure Assessment (qSOFA) are effective at identifying higher severity sepsis presentations, but do not target the early subtle signs many patients present within the emergency department. Data-driven machine learning techniques offer the opportunity to detect sepsis patients that are missed by SIRS without incurring additional false alerts. In the United Kingdom, the National Early Warning Score ("NEWS") is most common screening method, while in the United States, SIRS is commonly applied for sepsis and Modified Early Warning Score ("MEWS") is commonly applied for general deterioration. These scores, SIRS excepting, rely on vital signs routinely collected during emergency department triage, enabling a quick assessment and earlier treatment. This is key because it has been established that each hour delay in antibiotic treatment for sepsis leads to a 4-8% increase in mortality.

The most commonly used Early Warning Scores ("EWS") were developed by expert committees on small to moderate patient cohorts. MEWS and SIRS were developed on a cohort of under a thousand admissions at single hospitals. However, advances in clinical data informatics and computing have enabled increased precision in screening tools due to much larger patient cohorts and sophisticated machine learning models which can identify subtle patterns and interplays between multiple vital signs. Studies have shown the use of such tools to be effective in reducing intensive care unit transfer, decreasing length of stay, and reducing patient mortality.

There is a need for an effective emergency department sepsis screen that addresses emergency department work processes that are prioritized based on severity, and a lack of a sepsis screening tool that is accurate for early recognition.

SUMMARY

The present disclosure includes one or more of the features recited in the appended claims and/or the following features which, alone or in any combination, may comprise patentable subject matter.

According to a first aspect of the disclosed embodiments, a vital signs monitor for detecting sepsis in a patient includes a housing. At least one vital sign sensor is coupled to the housing and is configured to obtain at least one vital sign from a patient. A display is positioned on an outer surface of the housing. A controller is embedded in the housing and is operable to receive a vital sign signal from the at least one vital sign sensor. The controller includes a processor and a memory device. The memory device includes a non-transitory portion storing instructions that, when executed by the processor, cause the controller to acquire the vital sign signal from the at least one vital sign sensor. The controller is also configured to input the vital sign signal to a predefined vital sign model stored in the memory to establish a membership of risk indicated by the vital sign signal. The controller is also configured to determine a confidence interval for the membership. If the confidence is sufficient, the controller is also configured to automatically calculate a sepsis risk score for the patient. The sepsis risk score is indicative of a risk level of the patient having sepsis. The controller is also configured to display the sepsis risk score on the display.

In some embodiments of the first aspect, the predefined vital sign model can be developed for an intended target population of patients. The intended target population of patients can include subgroups including at least one of a gender of the patient, an ethnicity of the patient, and an age of the patient. The intended target population of patients can include patients admitted to a predefined department of a healthcare facility. The predefined department of the healthcare facility can include the emergency department.

Optionally, in the first aspect, the predefined vital sign model can operate an algorithm that is trained using a clinical indication of sepsis as the outcome. The instructions, when executed by the processor, can further cause the controller to perform a deterioration screen calculation to determine a deterioration risk level for the patient. The instructions, when executed by the processor, can further cause the controller to display the deterioration risk level and a recommended clinical action on the display. The instructions, when executed by the processor, can further cause the controller to activate an alert on the vital signs monitor based on the risk level of the patient having sepsis. The instructions, when executed by the processor, can further cause the controller to display an individual vital sign of the at least one vital sign contributing to the sepsis risk score on the display. The instructions, when executed by the processor, can further cause the controller to display a severity level of the individual vital sign of the at least one vital sign contributing to the sepsis risk score on the display. The instructions, when executed by the processor, can further cause the controller to display a hospital protocol associated with the sepsis risk score on the display.

It can be contemplated, in the first aspect, that the instructions, when executed by the processor, further cause the controller to accept a user supplied text file containing specifications for a user supplied model trained to detect deterioration in a target patient population using vital signs. The user supplied text file can includes a reference set of input vital signs that are applied to the user supplied model, and a reference set of output sepsis risk scores. The instructions, when executed by the processor, can further cause the controller to determine if an actual set of computed sepsis risk scores using the user supplied model match the reference set of sepsis risk scores in the user supplied model. If the actual set of computed sepsis risk scores using the user supplied model matches the reference set of sepsis risk scores in the user supplied model, the instructions, when executed by the processor, can further cause the controller to activate the user supplied model as the predefined vital sign model for use in the vital signs monitor.

It can be desired, in the first aspect, that the at least one vital sign includes at least one of a temperature of the patient, a heart rate of the patient, a systolic and diastolic blood pressure of the patient, a respiratory rate of the patient, and a blood oxygen saturation of the patient. The at least one vital sign can include a set of vital signs including at least two of a temperature of the patient, a heart rate of the patient, a systolic and diastolic blood pressure of the patient, a respiratory rate of the patient, and a blood oxygen saturation of the patient. The sepsis risk score can be calculated using a single set of vital signs. The at least one vital sign sensor can include at least one of a blood pressure cuff, a thermometer, and a pulse oximeter.

According to a second aspect of the disclosed embodiments, a method for detecting sepsis in a patient with a vital signs monitor includes acquiring, at the vital signs monitor, a vital sign signal from at least one vital sign sensor coupled to a housing of the vital signs monitor. The method also includes inputting the vital sign signal to a predefined vital sign model stored in the memory of a controller embedded in the housing to establish a membership of a risk indicated by the vital sign signal. The method also includes determining a confidence interval for the membership. If the confidence is sufficient, the method also includes automatically calculating a sepsis risk score for the patient, wherein the sepsis risk score is indicative of a risk level of the patient having sepsis. The method also includes displaying the sepsis risk score on a display positioned on an outer surface of the housing.

In some embodiments of the second aspect, the predefined vital sign model can be developed for an intended target population of patients having subgroups including at least one of a gender of the patient, an ethnicity of the patient, an age of the patient, and patients admitted to a predefined department of a healthcare facility. The method can also include performing a deterioration screen calculation to determine a deterioration risk level for the patient. The method can also include displaying the deterioration risk level and a recommended clinical action on the display. The method can also include activating an alert on the vital signs monitor based on the risk level of the patient having sepsis. The method can also include displaying an individual vital sign of the at least one vital sign contributing to the sepsis risk score on the display. The method can also include displaying a severity level of the individual vital sign of the at least one vital sign contributing to the sepsis risk score on the display. The method can also include displaying a hospital protocol associated with the sepsis risk score on the display.

Optionally, in the second aspect, the method can also include accepting a user supplied text file containing specifications for a user supplied model trained to detect deterioration in a target patient population using vital signs. The user supplied text file can include a reference set of input vital signs that are applied to the user supplied model, and a reference set of output sepsis risk scores. The method can also include determining if an actual set of computed sepsis risk scores using the user supplied model match the reference set of sepsis risk scores in the user supplied model. If the actual set of computed sepsis risk scores using the user supplied model matches the reference set of sepsis risk scores in the user supplied model, the method can also include activating the user supplied model as the predefined vital sign model for use in the vital signs monitor.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 8 is a table of discharge summary and vitals extracted from patient data to develop the exemplary vital sign model;

FIG. 9 is a table of a breakdown of the percentage of missing fields from patient data used to develop the exemplary vital sign model;

FIG. 10 is a table of a breakdown of diagnostic count per code for the final cohort of patient data used to develop the exemplary vital sign model;

FIG. 23 is a summary table of the data shown in the graphs of FIG. 9;

FIG. 26 is a graph of comparison metrics for the exemplary vital sign model and the SIRS model;

FIG. 27 is a graph of median vital signs for new cases identified with the exemplary vital sign model but not alerted by the SIRS model and avoided false alarms that were alerted by SIRS model but not by the exemplary vital sign model;

FIG. 34 is a graph of sensitivity and specificity of the exemplary vital sign model broken down by gender, ethnicity, and age;

FIG. 47 is a table of median data for various degrees of sepsis;

FIG. 48 is another table of median data for various degrees of sepsis; and

FIG. 49 is a table displaying rates at which procedures for preventing sepsis are administered.

DETAILED DESCRIPTION

Figure 1:
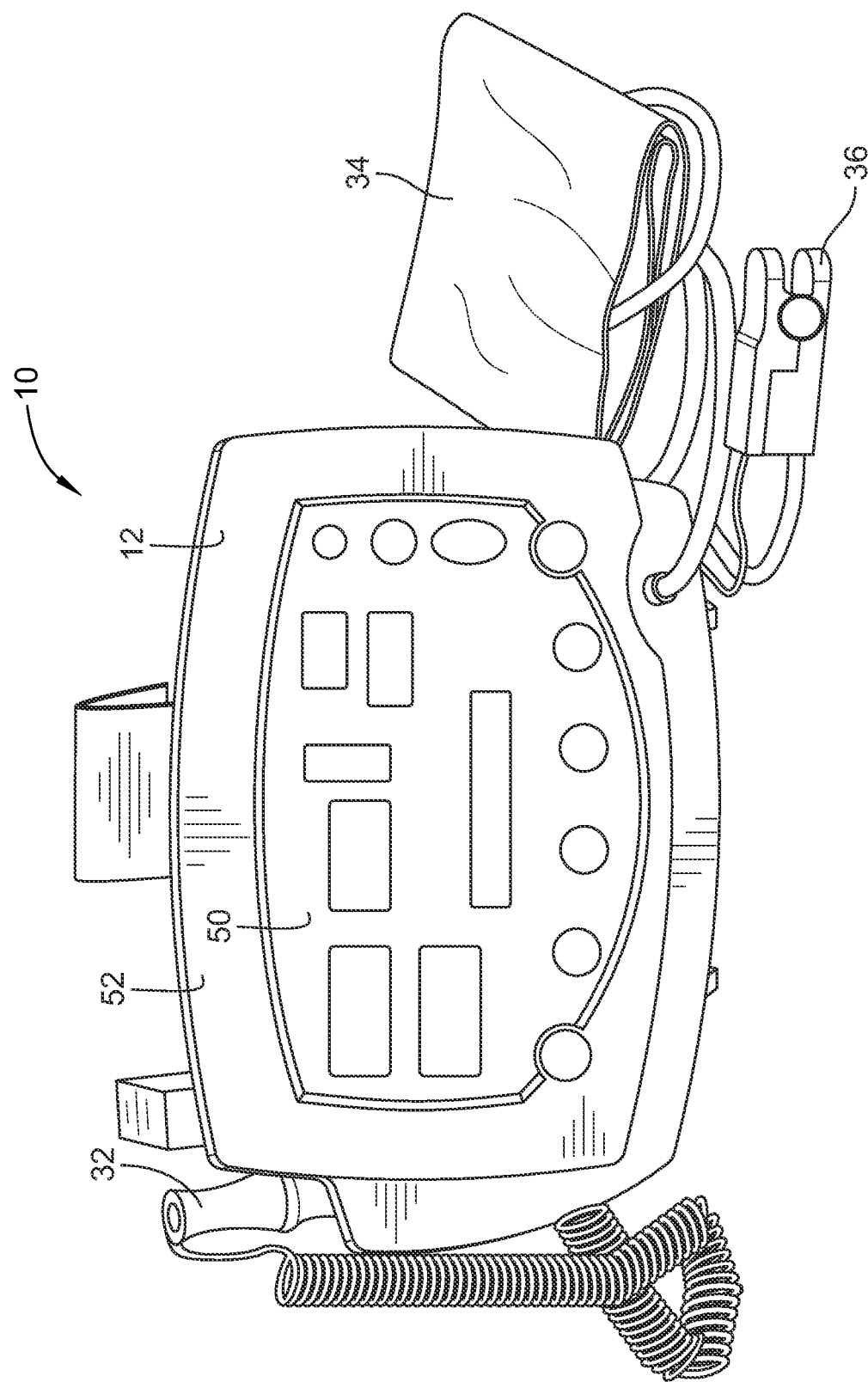
FIG. 1 is a perspective view of a vital signs monitor for detecting sepsis in a patient in accordance with an embodiment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Sepsis is a life-threatening organ dysfunction caused by a dysregulated host response to infection. If not recognized early and managed promptly, sepsis can lead to septic shock, multiple organ failure and death. Prompt treatment with antibiotics and intravenous fluid is essential to survival for septic patients.

Patient vital signs are commonly used to assess hospital patients for sepsis. The Systemic Inflammatory Response Syndrome (SIRS) score, which was a component of the first clinical definition of sepsis, assesses the patient for out of range heart rate, temperature, respiratory rate, and white blood cell count. Alternatively, the quick Sequential Organ Failure Assessment (qSOFA) score assesses the patient for out of range systolic blood pressure, respiratory rate, and Glasgow Coma Scale (GCS). Commonly, a patient vital signs monitor is used in the hospital setting to capture vital signs. For example, some vital signs monitors include multiple sensors, including a blood pressure cuff to measure blood pressure, a thermometer to measure temperature, and a finger pulse oximeter, which is also capable of plethysmography for the detection of heart rate and respiratory rate.

Recent advances in machine learning have realized an improved ability to screen for deterioration in patients using vital signs. Currently, machine learning based solutions rely on multiple components such as the vital signs monitor, an electronic medical record, a server, and a mobile device, tablet, or desktop application. This adds complexity both at the technological level and the user level. The embodiments described herein provide a vital signs monitor 10 capable of measuring vital signs, performing a deterioration screen calculation, and displaying the resulting deterioration risk level and recommended action on the vital signs monitor 10. When the recommended action is to apply treatment, the time to treatment is reduced to a minimum.

Emergency department processes today are focused on diagnosing and treating a patient's presenting symptoms versus longitudinal treatment of a specific disease. Patients with severe presenting symptoms are prioritized adding wait time for sepsis patients who often present with subtle symptoms or unremarkable vital signs. Utilizing the Emergency Severity Index (ESI), levels 1-2 are evaluated by a provider within 10 minutes. However, this represents only 21% of emergency department patients while 79% of patients are ESI levels 3-5, which represents sepsis patients with initially less severe symptoms. These patients will wait up to 120 minutes. Patients that presented with less severe sepsis made up a majority of sepsis deaths in two independent cohorts. In a 28,865-patient cohort study of patients presenting to the emergency department with suspected sepsis, the time interval from emergency department arrival to order placement accounted for 80% of the total delay in treatment with a median value of 2.7 hours, while only 20% of the delay was associated with the time interval from order placement to treatment administration. The mismatch of severity-based treatment leading to delays in care is poised to worsen with population aging (particularly amongst those >65+ with comorbidities). Along with increased emergency department visits due to population growth, the emergency department with be further strained as aggregate time spent in the emergency department is estimated to grow 10% faster than population growth. To meet this challenge, the disclosed embodiments provide an early sepsis specific screening tool administered to all patients regardless of severity or suspicion of infection.

The clinical presentation of sepsis is often subtle and nonspecific, and identification of sepsis in the emergency department is often based upon clinical judgement. Many facilities utilize early warning scores, which are non-sepsis specific measuring all cause deterioration and often miss the subtle cues and early signs of sepsis patients commonly present with in the emergency department. The SIRS score previously defined and identified sepsis but has been criticized for its low specificity. This led to the development of the quick Sequential Organ Failure Assessment (qSOFA) which has been shown to have better specificity than SIRS but lower sensitivity. Both SIRS and qSOFA are more effective for identifying higher severity presenting symptoms. SIRS and qSOFA are not designed to target early subtle signs.

To address accuracy, machine learning has been rapidly utilized in healthcare sciences to enhance predictive, prognostic and diagnostic methods. By utilizing big data and computing power, healthcare professionals and data scientists collaborate to build data-driven, fine-tuned models of sepsis risk which can model relationships between vital signs. A retrospective study from nine United States hospitals showed that a machine learned algorithm (MLA) sepsis screening tool was superior at predicting onset of sepsis as compared to MEWS, qSOFA, and SIRS. However, there is a concern that many machine learned sepsis models used in the hospital will not perform in a specific emergency department as reported. Accordingly, models need to be easily externally validated. In one study, a sepsis prediction model utilized in 56% of hospital and health systems in the United State was recently found to be substantially less accurate than reported.

The vital signs monitor 10 described herein provides an all-patient emergency department triage machine learned sepsis screen that is trained specifically to detect sepsis, that is developed with emergency department patient data, that requires only a single set of vital signs, and includes a machine learned, data-driven model.

Machine learning-based early warning systems can achieve greater accuracy than traditional early warning systems, but this can be misleading if clinical workload and resources are not considered. Integration into clinical care is the most challenging barrier to effectively integrating machine learning models. Since a set of emergency department triage vital signs is consistently collected for all patients upon emergency department arrival, the vital signs monitor 10 requires no changes to workflow at the time of vitals collection. Additionally, the machine learned model of the vital signs monitor 10 is open source and based on open data. Accordingly, the model can be easily validated externally by a wide base of medical researchers.

A study according to the disclosed embodiments utilized publicly available data from the MIMIC III ICU database, which was filtered into an emergency department adult patient cohort with a complete set of vitals. The vitals were extracted from the free text discharge summaries. The disclosed embodiments present the actual sepsis risk for each core vital sign among the emergency department cohort. Machine learning was applied to build an emergency department specific data driven sepsis model and show improved accuracy comparted to SIRS. Reproducibility and generalizability of the present model was evaluated. The embodiments described herein provide an accurate, early sepsis screening method that can be consistently implemented into existing emergency department work process.

Figure 2:
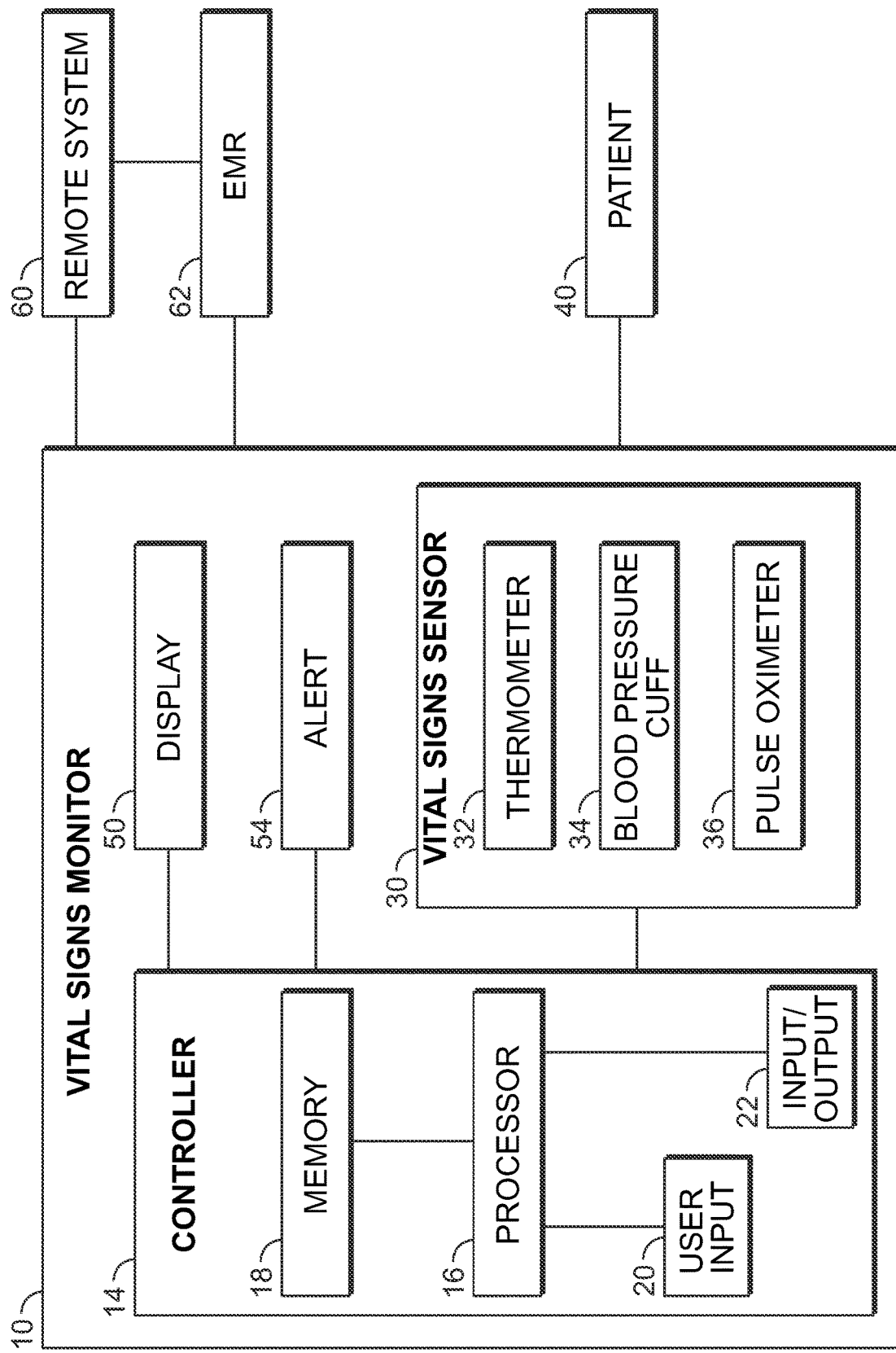
FIG. 2 is a schematic view of the vital signs monitor shown in FIG. 1.

Referring now to FIGS. 1 and 2, a stand-alone patient vital signs monitor 10 assesses a patient for vital signs including but not limited to temperature, heart rate, systolic and diastolic blood pressure, respiratory rate, and blood oxygen saturation. The vital signs monitor 10 calculates a sepsis risk score based on a model that is machine learned and designed specifically for sepsis. That is, the machine learning algorithm is trained using a clinical indication of sepsis as the outcome. It will be appreciated that a model may be developed to detect other diseases or complications. The model is further developed with intended target population specific patient data. If the model is intended for use in the emergency department, the development dataset must also be emergency department patient data. The model alerts caregivers based on vital signs acquired by the vital signs monitor 10. The vital signs monitor 10 displays a severity level of sepsis risk, a severity level of individual vital signs contributing to sepsis risk, and a hospital unit level protocol associated with the sepsis risk level. Accordingly, the vital signs monitor 10 measures vital signs, performs the deterioration screen calculation, and displays the resulting deterioration risk level and recommended clinical action on the vital signs monitor 10.

In one embodiment, the vital signs monitor 10 accepts a new user supplied text file containing the specifications of a machine learned model trained to detect deterioration in a target patient population using vital signs. The vital signs monitor 10 simultaneously accepts a user supplied text file representing a reference set of input vital signs which the vital signs monitor 10 applies to the model and checks against a user supplied text file representing a reference set of output sepsis risk scores. If the actual set of computed sepsis risk scores match the reference set of sepsis risk scores, then the vital signs monitor 10 activates the user supplied model for use in the vital signs monitor 10.

The vital signs monitor 10 includes housing 12 that houses a controller 14. The controller 14 includes a processor 16 and a memory device 18. The memory device 18 includes a non-transitory portion storing instructions that, when executed by the processor 16, cause the controller 14 to carry out the operations described below. A user input 20 enables a caregiver or technician to enter commands to control the vital signs monitor 10. An input/output 22 is provided to enter data, for example text files or other data, from an external device (not shown) for example an external drive or memory device into the controller 14 and the memory device 18. Additionally, the input/output 22 can output data to the external device.

At least one vital signs sensor 30 is coupled to and/or extends from the housing 12. In the exemplary embodiment, the vital signs sensor 30 can include a thermometer 32, a blood pressure cuff 34, and a pulse oximeter 36. It will be contemplated that the vital signs sensor 30 can include other types of sensors typically used in a healthcare setting, particularly an emergency department setting. The vital sign sensor 30 obtains at least one vital sign from a patient 40. For example, a temperature of the patient 40 can be monitored by the thermometer 32. A heart rate of the patient 40 and a systolic and diastolic blood pressure of the patient 40 can be monitored by the blood pressure cuff 34. A respiratory rate of the patient 40 and a blood oxygen saturation of the patient 40 can be monitored by the pulse oximeter 36.

The vital signs monitor 10 includes a display 50 that is positioned on an outer surface 52 of the housing 12. The display 50 illustrates data from the at least one vital signs sensor 30. For example, the display 50 can display a temperature of the patient 40, a heart rate of the patient 40, a systolic and diastolic blood pressure of the patient 40, a respiratory rate of the patient 40 and a blood oxygen saturation of the patient 40. As described below, the display 50 can also display information related to a sepsis risk score that is indicative of a risk level of the patient 40 having sepsis. The user input 20 can be integrated into the display 50. For example, the display 50 can be a touch-screen display. An alert 54 is provided to alert a caregiver of various patient conditions. The alert 54 can be a visual alert, for example a light, or an audible alert, for example, an alarm or a prerecorded message that is audibly transmitted from the alert 54. The alert 54 can be integrated into the display 50. For example, the alert 54 can include a message displayed on the display 50.

The vital signs monitor 10 can be electronically coupled, either through a wireless network or through a wired network, to a remote system 60. The remote system 60 can be a remote computer at a nurse's station, a remote computer at a doctor's office, a remote computer within a healthcare facility, or a handheld device, mobile device, or mobile phone of a caregiver. The vital signs monitor 10 can also be electronically coupled, either through a wireless network or through a wired network, to an electronic medical record 62. The electronic medical record 62 can record data from the vital signs monitor 10. For examples, vital signs and alerts from the vital signs monitor 10 can be recorded in the electronic medical record 62.

Figure 3:
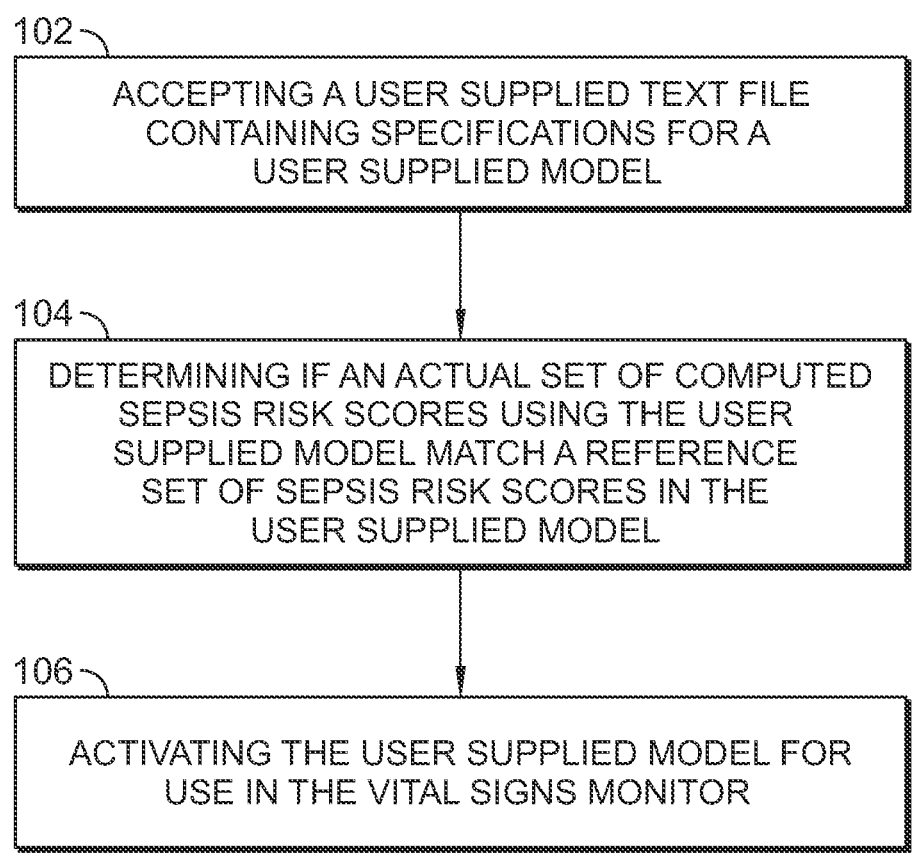
FIG. 3 is a flowchart for a method of defining a vital sign model for use in the vital signs monitor shown in FIG. 1.

Referring to FIG. 3, a method 100 of defining a vital sign model for use in the vital signs monitor 10 is illustrated. At block 102, the controller 14 accepts a user supplied text file containing specifications for a user supplied model trained to detect deterioration in a target patient population using vital signs. In one embodiment, the user supplied text file includes a reference set of input vital signs that are applied to the user supplied model. In one embodiment, the user supplied text file also includes a reference set of output sepsis risk scores. At block 104, the controller 14 determines if an actual set of computed sepsis risk scores using the user supplied model match the reference set of sepsis risk scores in the user supplied model. If the actual set of computed sepsis risk scores using the user supplied model matches the reference set of sepsis risk scores in the user supplied model, the controller 14 activates the user supplied model as the predefined vital sign model for use in the vital signs monitor 10, at block 106. In one embodiment, predefined vital sign model operates an algorithm that is trained using a clinical indication of sepsis as the outcome.

Figure 4:
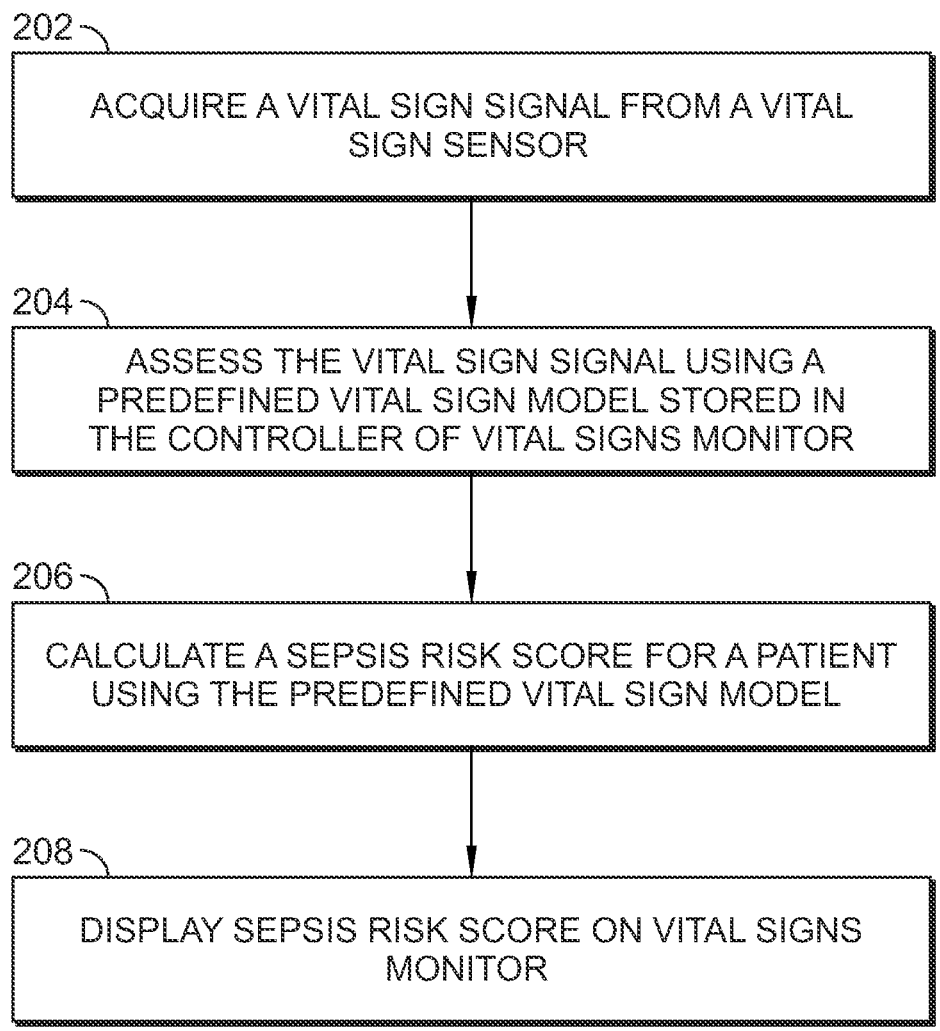
FIG. 4 is a flowchart for a method of utilizing the vital sign model to detect sepsis in a patient using the vital signs monitor shown in FIG. 1.

FIG. 4 illustrates a method 200 of utilizing the vital sign model to detect sepsis in a patient using the vital signs monitor 10, wherein the vital sign model has been accepted and activated using the method 100 described in FIG. 3. At block 202, the vital signs monitor 10 acquires a vital sign signal from at least one of the vital signs sensors 30. As set forth above, the vital signs sensor 30 can include any one of, or combination of the thermometer 32, the blood pressure cuff 34, and the pulse oximeter 36. In some embodiments, the vital sign signal can be indicative of at least one vital sign detected by the vital signs sensor 30 including, but not limited to, a temperature of the patient, a heart rate of the patient, a systolic and diastolic blood pressure of the patient, a respiratory rate of the patient, and a blood oxygen saturation of the patient. In some embodiments, the vital sign signal can be indicative of a set of vital signs including at least two of a temperature of the patient, a heart rate of the patient, a systolic and diastolic blood pressure of the patient, a respiratory rate of the patient, and a blood oxygen saturation of the patient.

At block 204, the controller 14 assesses the vital sign signal using the predefined vital sign model. Particularly, the controller 14 inputs the vital sign signal into the predefined vital sign model stored in the memory to establish a membership of risk indicated by the vital sign signal. At block 206, the controller 14 calculates a sepsis risk score for the patient using the predefined vital sign model. For example, controller 14 can determine a confidence interval for the membership. If the confidence is sufficient, the controller 14 automatically calculates a sepsis risk score for the patient. The sepsis risk score is indicative of a risk level of the patient having sepsis. In some embodiments, the sepsis risk score is calculated based on a single vital sign. In some embodiments, the sepsis risk score is calculated based on a single set of vital signs. The controller 14 can determine the sepsis risk score by performing a deterioration screen calculation to determine a deterioration risk level for the patient.

At block 208, the controller 14 displays the sepsis risk score on the display 50 of the vital signs monitor 10. The controller 14, in some embodiments, displays the deterioration risk level and a recommended clinical action on the display 50. In some embodiments, the controller 14 displays an individual vital sign contributing to the sepsis risk score on the display 50. The controller 14 can also display a severity level of the individual vital sign of the at least one vital sign contributing to the sepsis risk score on the display 50. In at least one embodiment, the controller displays a hospital protocol associated with the sepsis risk score on the display 50. The controller 14 can also activate the alert 54 on the vital signs monitor 10. In some embodiments, whether the alert 54 is activated can be based on the risk level of the patient having sepsis.

Figure 5:
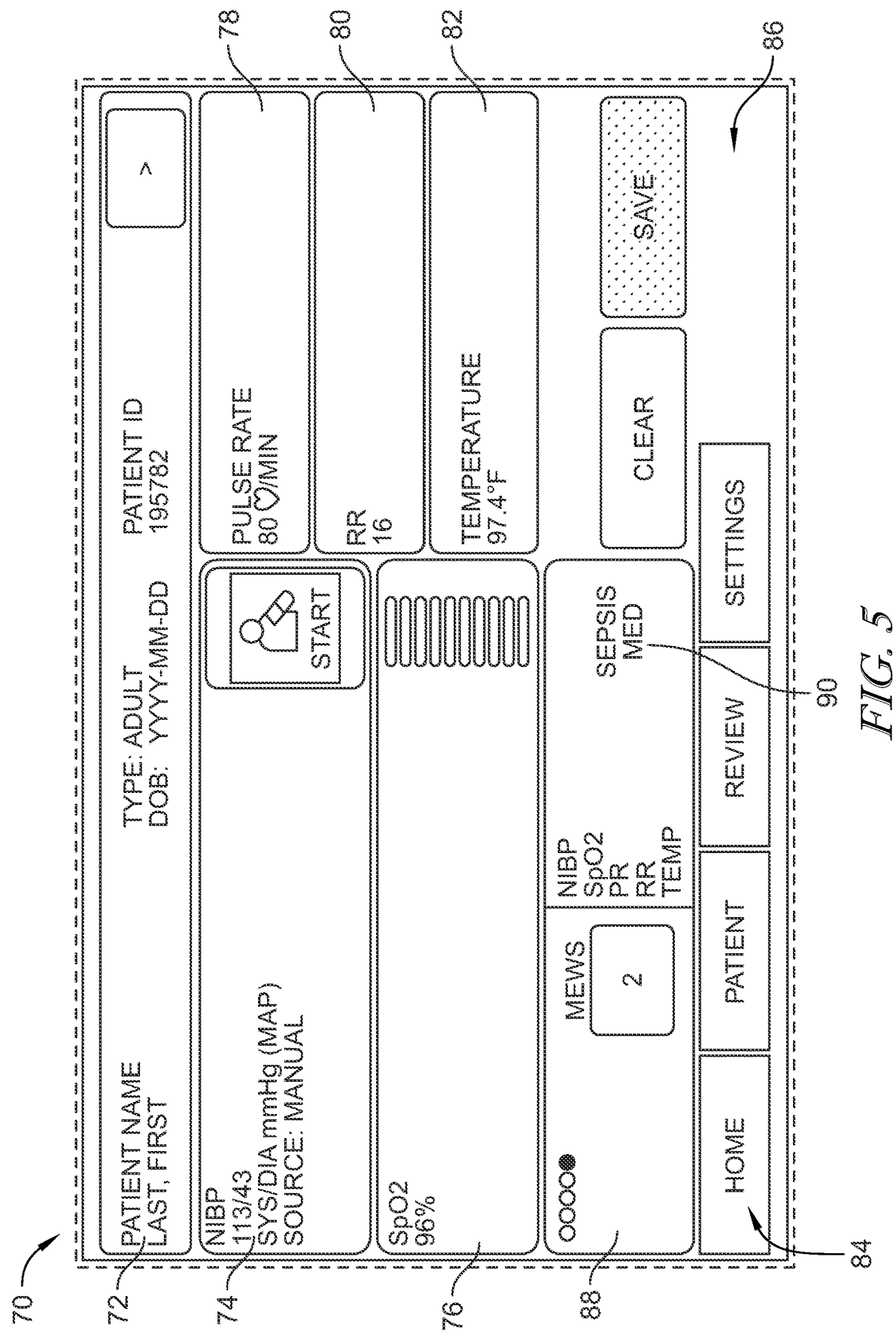
FIG. 5 is an exemplary screen that can be displayed on the display of the vital signs monitor shown in FIG. 1.

Referring to FIG. 5, an exemplary screen 70 can be shown on the display 50. The screen 70 includes an identification segment 72 that illustrates the patient name, patient ID, and patient date of birth. The patient's blood pressure is illustrated in segment 74, and the patient's oxygen level is illustrated in segment 76. Segment 78 illustrates the patient's heart rate, segment 80 illustrates the patient's respiratory rate, and segment 82 illustrates the patient's temperature. A series of buttons 84 at the bottom 86 of the screen 70 allow the caregiver to navigate between screens on the display 50.

Figure 6:
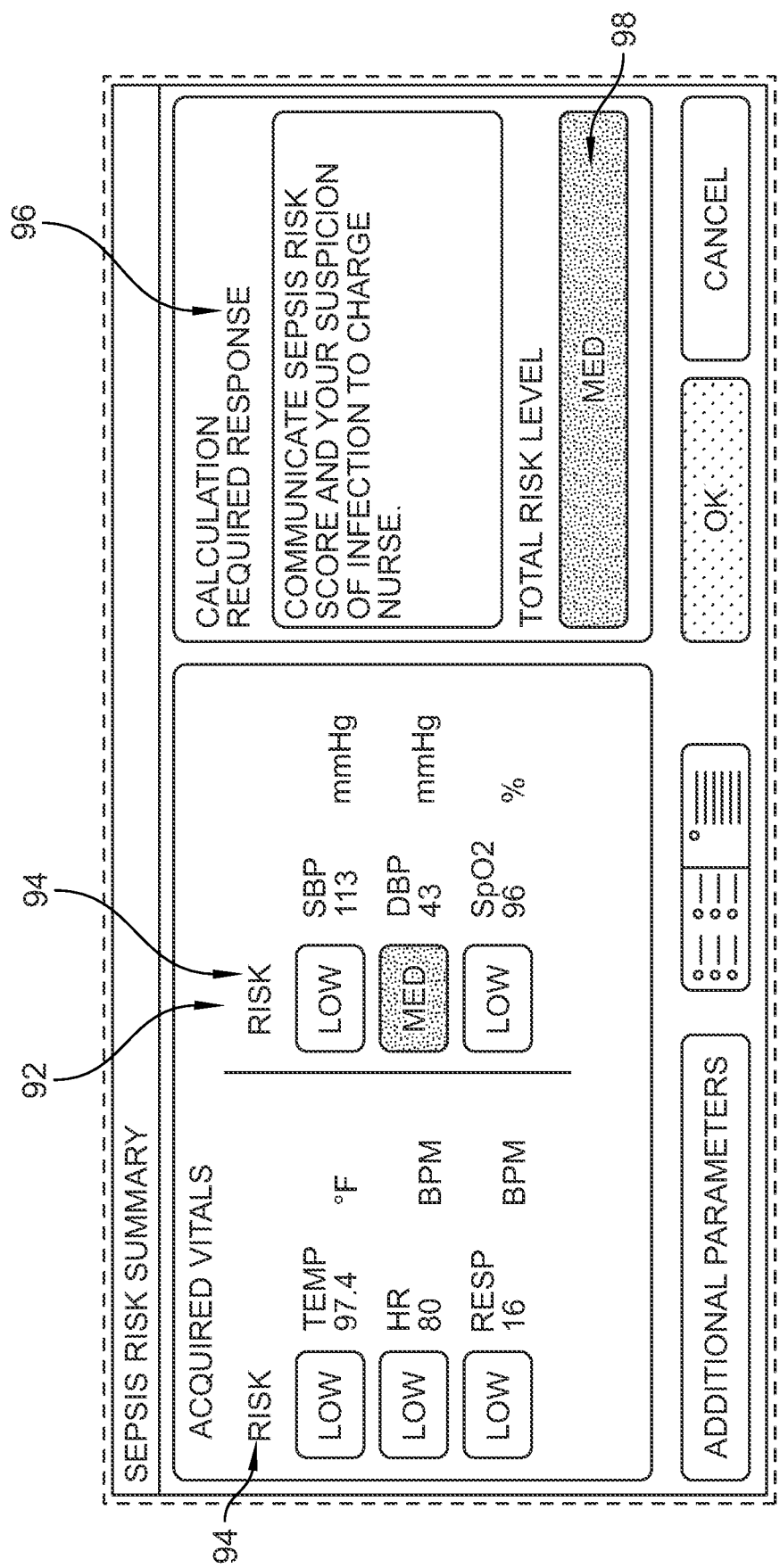
FIG. 6 is an exemplary screen that can be displayed on the display of the vital signs monitor shown in FIG. 1.

A MEWS score for the patient is illustrated at 88 next to a sepsis specific score 90 derived from the method described above. The parameters of the sepsis specific score 90 are weighted based on detected vital signs. For example, if the patient's temperature is within a first range, the patient's blood pressure may be weighted by a first predetermined weight. If the patient's temperature is within a second range different than the first range, the patient's blood pressure may be weighted by a second predetermined weight. Accordingly, any of the vital signs may be weighted by the model described above based on a range of another vital sign, for example, oxygen level may be weighted based on the detected respiratory rate, temperature may be weighted based on heart rate, etc. The sepsis specific score 90 is displayed next to the MEWS score 88. It will be appreciated that the sepsis specific score 90 can also be illustrated in tandem with a SIRS score or other known score. FIG. 6 illustrates another screen 92 that includes a risk level 94 for each vital sign detected. The screen 92 also displays a required response 96 for the caregiver in response to a total risk level 98 detected.

Figure 7:
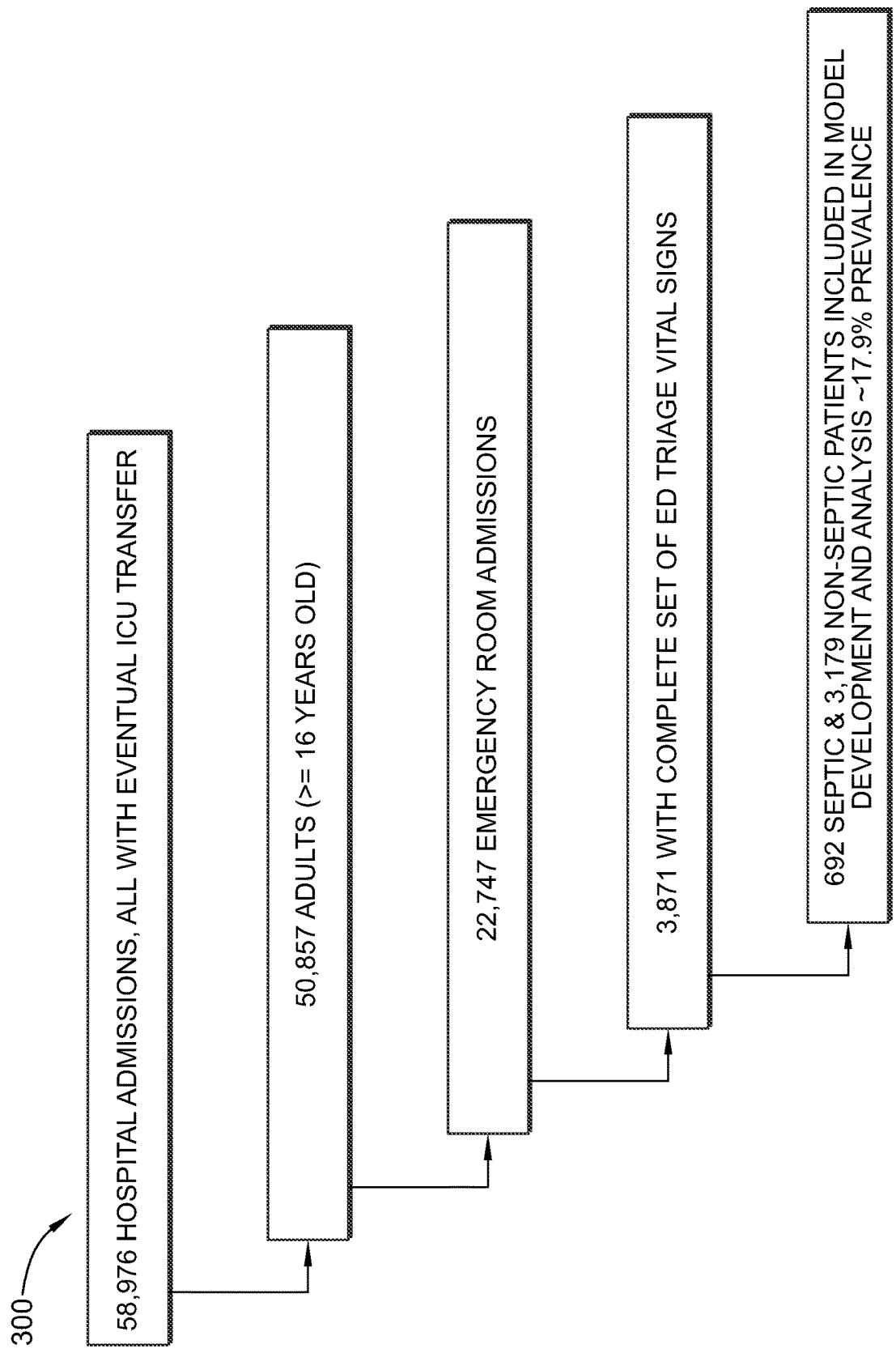
FIG. 7 is a flowchart for inclusion criteria of an intended target population of patients for developing an exemplary vital sign model.

FIG. 7 illustrates a flowchart 300 for inclusion criteria of an intended target population of patients for developing an exemplary vital sign model. The machine learned algorithm of the disclosed embodiments is aimed at identifying the early subtle signs of sepsis at emergency department triage to produce an accurate screening tool that can be consistently integrated into existing triage workflow for all patients. The disclosed embodiments provide data-driven modeling of sepsis risk at emergency department triage for each of the core vital signs. Machine learning is applied to build an emergency department triage specific data-driven sepsis model using only a single set of triage vitals as inputs. Compared to SIRS, the disclosed embodiments identify 9% additional true sepsis cases, and simultaneously reduce false positives by 19%.

In some embodiments, the intended target population of patients includes subgroups including at least one of a gender of the patient, an ethnicity of the patient, and an age of the patient. The intended target population of patients can include patients admitted to a predefined department of a healthcare facility, for example, the emergency department in the exemplary embodiments.

The source data is derived from the MIMIC-III ICU database, which includes 61,532 intensive care unit stays from Beth Israel Deaconess Hospital in Boston, MA, USA. The data spans June 2001-October 2012. The dataset contains anonymized patient-level data that retains relative time stamps but obscures absolute time stamps for privacy. The dataset includes vitals, nursing assessments, inputs and outputs while the patient was in the intensive care unit (ICU). Additionally, the data includes laboratory results, microbiology reports, transfers, demographics, and free-text notes from the entire patient stay at the ICU. The study described by the disclosed embodiments includes patients age 16 and older who were admitted through the emergency department. Due to the nature of the dataset, the cohort includes only patients who were eventually transferred to the ICU.

The majority of the patient level data is contained in structured fields. However, none of the structured data contains emergency department vital signs. Emergency department vital signs are contained in unstructured free-text notes. The study of the disclosed embodiments focused on discharge summary reports. Extraction efforts included manually parsing 200 examples of patient data including 100 examples with a complete set of emergency department vitals. A rule-based natural language processing software was developed to auto-extract the vital signs. 100% accuracy in extraction was achieved by using the following sequence, simplified for demonstration. Within the "History of Present Illness" section a text search was performed for terms such as "vital", "VS", "ED", "arrival" and the text was cleaned and standardized (e.g. 98.6 F→98.6 F). Several steps of logic were applied including probable order of the vitals, valid ranges of the vitals, and vitals prefixes/suffixes to parse the text into fields. Example discharge summary and vitals extracted can be seen in FIG. 8.

A final data set included only patients, who were admitted through the emergency department for whom all emergency department vital signs could be extracted from the discharge summary. Accordingly, there were no missing vitals in the final data set. Laboratory values associated with SIRS were included only if the lab was drawn within 4 hours of registration. There were missing lab values in some patient records, which were filled with median value across the data set. Detailed breakdown of percentage of missing fields can be found in FIG. 9. Sepsis status was determined using ICD-9 codes for sepsis. Codes used were 995.91(Sepsis), 995.92 (Severe Sepsis) and 785.52 (Septic Shock). FIG. 5 outlines the inclusion criteria for the final cohort. A breakdown of diagnostic count per code can be seen in FIG. 10.

Actual sepsis risk ratios were calculated for individual vital signs across bins. The median value across the non-septic cohort was selected as a baseline. The gradient boosting machine learning algorithm was leveraged to model sepsis risk. When building the model, to prevent overfitting, data set was split using 5-fold cross validation where a single subject is never part of both train and test set. Thus, the model is always evaluated on data which it has never previously been exposed. To assess the accuracy of the model, accuracy was compared to the SIRS criteria.

Analysis was performed of the additional positives detected by the model compared to SIRS as well as an analysis of reduced false positives. Median vital sign values were calculated within each subgroup. In order to assess generalizability and bias, a subgroup analysis was performed for demographics including age, gender, and ethnicity.

The final cohort as outlined in FIG. 7 consists of 3,871 emergency department admissions from Beth Israel Deaconess Medical Center between 2001 and 2012. All admissions eventually transferred to the ICU. The vital signs used for analysis included the complete set of emergency department triage vitals extracted from free text notes. The cohort showed a 17.9%. sepsis prevalence.

Figure 11:
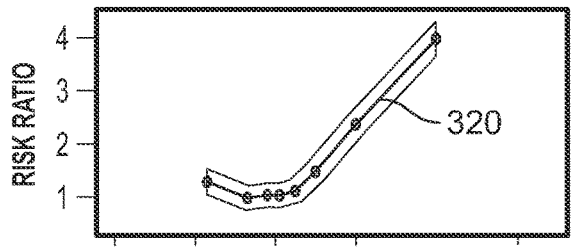
FIG. 11 illustrates a graph of risk ratio for both septic and non-septic patients in the intended target population of patients.

FIG. 11 illustrates several graphs of vital sign data for both septic and non-septic patients in the intended target population of patients. The graphs illustrate actual sepsis risk ratios for 3871 emergency department admissions from MIMIC-III with a full set of emergency department vitals. 692 emergency department admissions were coded for sepsis. Risk ratio is the proportion of septic patients within an octile bin divided by the sepsis rate at baseline (median value among non-septic patients). 95% confidence interval ("CI") is shown for each risk ratio in line 320. Density plots display the population distributions of a vital sign across septic patients on line 322 and non-septic patients on line 324. A baseline median value among non-septic patients is marked is shown in line 326. Oxygen saturation and respiration rate show less than 8 bins due to a high proportion of patients at a certain value (e.g. 18 breaths per min, 100% SpO2).

Figure 12:
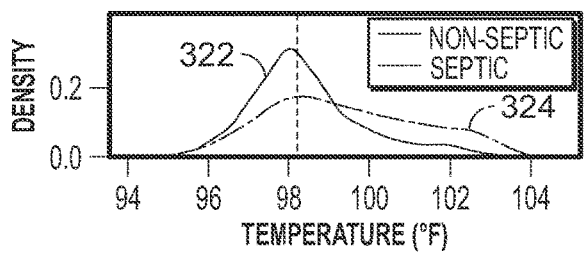
FIG. 12 illustrates a graph of density as a function of temperature for both septic and non-septic patients in the intended target population of patients.

FIG. 12 is a summary table of the data shown in the graphs of FIG. 11. Despite lack of validation in the emergency department setting, SIRS is commonly used as a screening tool in the emergency department to identify patients at risk for sepsis. Due to its clinical prevalence and availability in the data set of vital signs and leucocyte count, SIRS was used as the comparison metric for the study of the disclosed embodiments. Objectively, SIRS in adults is defined by meeting any two of the following criteria: (1) body temperature over 100.4 or under 96.8 degrees Fahrenheit, (2) heart rate greater than 90 bpm, (3) respiratory rate greater than 20 breaths/minute or partial pressure of CO2 less than 32 mmHg, and (4) leucocyte count greater than 12,000 or less than 4,000/microliter or over 10% immature forms or bands. The SIRS criteria that require no lab work and can be used in screening at emergency department triage are temperature, heart rate, and respiratory rate.

A comparison of risk ratios across vital signs between the septic and non-septic populations is presented in FIG. 11. A detailed breakdown of median values for vital signs and other key metrics appears in FIG. 12. As shown visually in FIG. 11 and quantitatively in FIG. 12, the differences between the septic and non-septic populations across vital signs are nonhomogeneous and subtle, with distributions and median differences presenting differently depending on vital sign. An epidemiologic study of over 1 million ICU patients found that the cutoff point of two SIRS criteria does not define any specific transition point for risk. The results of the disclosed embodiments align showing no clear, consistent transition point for risk. The maximum contribution of each vital sign via SIRS is 1, which does not reflect the unequal risk of each vital sign in the patient population of the study of the disclosed embodiments. For example, there is up to a fourfold increase in risk with rising temperature, but SIRS will score any temperature above the defined threshold equally. Septic and non-septic patients present median heart rate values of 100 and 92 bpm, respectively. Both values are above the SIRS threshold of 90 bpm and with a near insignificant difference in risk ratio. However, septic and non-septic patients present median temperatures of 98.2 and 99.3 (F), respectively. Neither value is outside of SIRS criteria, but there are large changes in associated risk ratio with increased temperature. With regards to temperature population densities, the non-septic group has a clear central tendency towards the median while the septic population shows much greater dispersion. Similar to temperature, septic and non-septic populations present similar median oxygen saturation values of 98% and 97%, respectively, but the non-septic group shows a clear central tendency close to 100 while the septic population shows much greater dispersion. However, in comparison to temperature, the risk ratio curve does not show large changes but instead looks almost stepwise with a constant elevated risk ratio for $SpO_2$ levels lower than 98%.

Another contrast in vital signs between the septic and non-septic population is noninvasive systolic blood pressure (NISBP) with the non-septic population presenting with a median NISBP of 129 as compared to 110 in the septic population. Additionally, a near linear drop in NISBP is seen with increasing sepsis severity by ICD definitions. Despite these large differences in risk ratio, blood pressure is not included in the SIRS criteria. NISBP is included in qSOFA, however the qSOFA cutoff is <=100, an indication of severe sepsis only.

Figure 13:
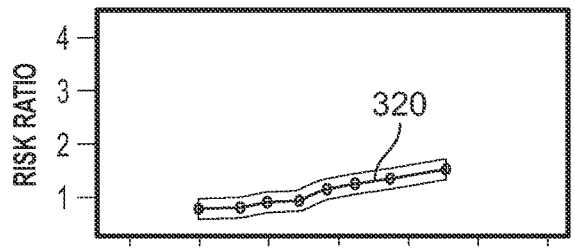
FIG. 13 illustrates a graph of another risk ratio for both septic and non-septic patients in the intended target population of patients.
Figure 14:
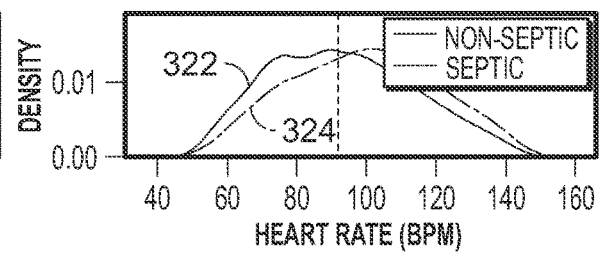
FIG. 14 illustrates a graph of density as a function of heart rate for both septic and non-septic patients in the intended target population of patients.

Area under receiver operating characteristic (ROC) and precision-recall curves for the vital sign model of the disclosed embodiments as compared to SIRS (>=2) are presented in FIG. 13. Further model performance metrics are reported in FIG. 14. The area under ROC of the vital sign model of the disclosed embodiments is superior to SIRS (0.77 vs 0.68). Similarly, the area under the precision-recall curves is superior for the vital sign model of the disclosed embodiment as compared to SIRS (0.39 vs 0.35). To compare sensitivity/specificity of the vital sign model of the disclosed embodiments to SIRS, the alerting threshold can be configured at 3 different points. Equal sensitivity applies a cutoff to match the sensitivity of SIRS, equal specificity applies a cutoff to match the specificity of SIRS, and balanced applies a cutoff equal to the average of the previous two cutoffs. At equal sensitivity to SIRS, the vital sign model of the disclosed embodiments reduces false alarms by 33%. At equal specificity to SIRS, the vital sign model of the disclosed embodiments identifies 17% additional true sepsis cases. At the balanced setting, the vital sign model of the disclosed embodiments identifies 9% additional true sepsis cases and reduces false alarms by 19%. Positive predicted value (PPV) is improved by 3%, 6%, and 9% respectively as compared to SIRS. SIRS is known to be highly sensitive, and thus lack specificity.

Figure 15:
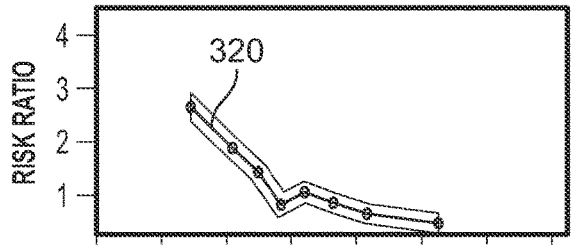
FIG. 15 illustrates a graph of another risk ratio for both septic and non-septic patients in the intended target population of patients.

Although SIRS is the most common objective measurement used to screen for sepsis, identification of sepsis in the emergency department is often based upon clinical judgement. FIG. 15 displays typical physiology among septic patients identified by the vital sign model of the disclosed embodiments and missed by SIRS. The median vital signs for new cases identified by the vital sign model of the disclosed embodiments are an excellent representation of the subtle, early presentation of sepsis that could be easily missed in a severity-based care environment like the emergency department. The median vital signs for the avoided false alarms illustrate a patient with elevated heart rate and respiratory rate.

Figure 16:
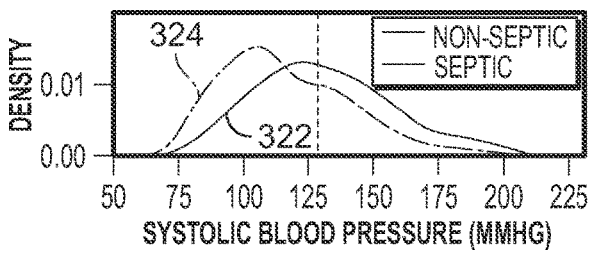
FIG. 16 illustrates a graph of density as a function of systolic blood pressure for both septic and non-septic patients in the intended target population of patients.

Returning to risk ratios of individual vital signs, FIG. 16 compares the alerting frequency of the vital sign model of the disclosed embodiments and SIRS to the actual risk ratios presented in FIG. 11. As an example, patients with a temperature of 100° F. have a 2.5-fold risk compared to baseline, and at 102° F. patients have a 4-fold risk. The vital sign model of the disclosed embodiments models the risk very well and alerts 2.5 times more often on patients with 100° F., and alerts 4 times more often on patients with 102° F. SIRS, however, alerts only 1.5 times and 2.5 times more often respective, representing an under-alerting at high temperatures. Conversely, SIRS over-alerts to patients with low temperatures. The vital sign model of the disclosed embodiments more accurately alerts in accord with actual risk ratios for all vitals, while SIRS typically over-alerts and under-alerts. These results illustrate the power of using machine learning algorithms like the vital sign model of the disclosed embodiments as they can model subtle trends that are easily missed by human judgement or threshold-based scoring like SIRS. Additionally, because SIRS does not include blood pressure in its criteria, it does not alert more often among patients with low blood pressure.

A subgroup analysis of gender, ethnicity, and age of the vital sign model of the disclosed embodiments (at balanced sensitivity/specificity) was performed. The results of this analysis appear in FIG. 17. The number of admissions were nearly equal between genders, with males showing an increase in sensitivity and specificity of 3% and 4%, respectively. The Asian population had an 18% increase in sensitivity as compared to the White population. A majority of patients were between the ages of 40-80, with 981 patients over the age of 80. The vital sign model of the disclosed embodiments performed similarly across all adult age groups. In conclusion, the model does not appear to have bias for gender, age, or White/Black ethnicities. There can be bias for lower represented ethnicities.

The vital sign model of the disclosed embodiments can incorporate trends and capture relationships among parameters that aggregate weighted models like SIRS cannot. For the cohort, the disclosed embodiments demonstrated superior performance to SIRS across all metrics including positive predictive value ("PPV") and area under ROC making the vital sign model of the disclosed embodiments a promising tool to screen for sepsis at the earliest point of contact, the emergency department triage. A recent review of sepsis algorithms currently used in hospitals found none to be designed for emergency department triage utilizing a single timepoint. By presenting a solution that utilizes a single timepoint at triage, delays in care can be reduced, especially for patients with subtle, nonspecific presentation.

Figure 17:
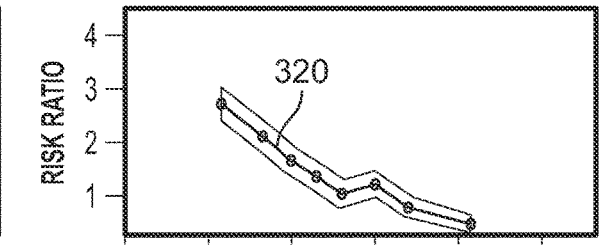
FIG. 17 illustrates a graph of another risk ratio for both septic and non-septic patients in the intended target population of patients.

As seen in FIG. 11, each vital sign was associated with a close to smooth risk ratio curve across vital sign value. This indicates stability of the results of the disclosed embodiments. Risk ratio is modeled to mitigate the inherent bias in modeling absolute sepsis risk. The study includes nearly 4,000 hospital admissions, including almost 700 sepsis patients per ICD-9 sepsis diagnoses. FIG. 17 indicates generalizability across gender, age, and White and African American ethnicities.

To recognize the subtle early signs of sepsis in the emergency room, all patients should be screened at triage with a tool that is sepsis-specific and accurate. The vital sign model of the disclosed embodiments uses a single set of vital signs at triage, which has shown superior positive predictive value for the early subtle onset of sepsis compared to SIRS. Compared to SIRS, the vital sign model of the disclosed embodiments identifies 9% additional true sepsis cases, and simultaneously reduces false positives by 19%. The improved accuracy of the vital sign model of the disclosed embodiments can expedite early identification of sepsis and thus enhance time to treatment, prognostic and diagnostic accuracy without changing normal triage workflow at the time of vitals collection. As an open-source model, the vital sign model of the disclosed embodiments delivers performance that can be easily externally validated to give clinicians confidence that it will perform in their emergency room consistently. There is a need for a systematic approach to recognizing early signs of sepsis. The intention of the vital sign model of the disclosed embodiments is to fill this need and improve the initial management of patients presenting with easily missed subtle signs of sepsis in the emergency room.

Figure 18:
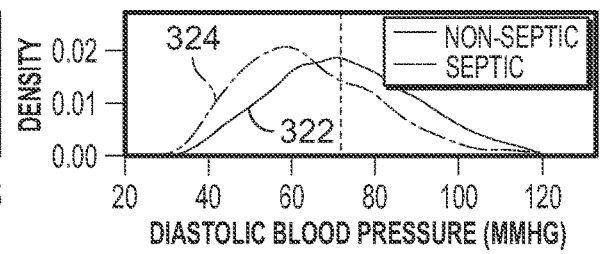
FIG. 18 illustrates a graph of density as a function of diastolic blood pressure for both septic and non-septic patients in the intended target population of patients.
Figure 19:
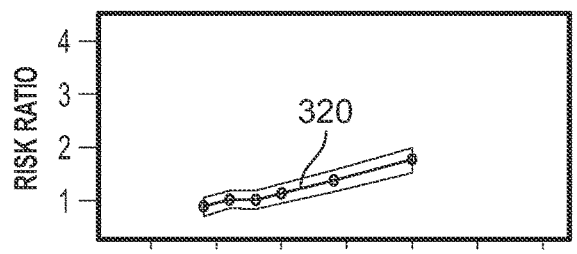
FIG. 19 illustrates a graph of another risk ratio for both septic and non-septic patients in the intended target population of patients.
Figure 20:
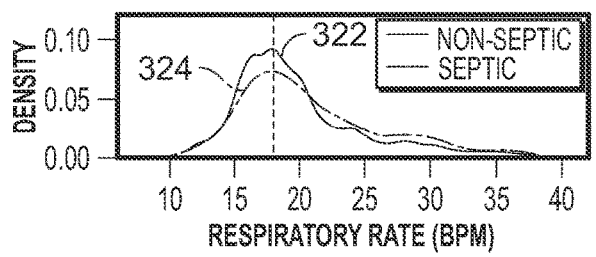
FIG. 20 illustrates a graph of density as a function of respiratory rate for both septic and non-septic patients in the intended target population of patients.
Figure 22:
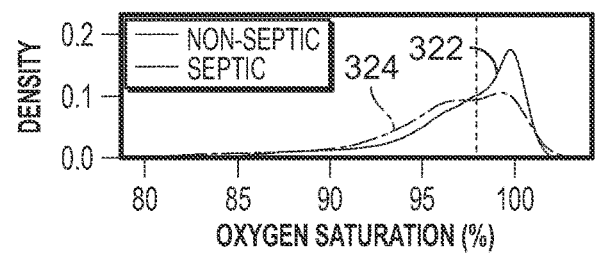
FIG. 22 illustrates a graph of density as a function of oxygen saturation for both septic and non-septic patients in the intended target population of patients.
Figure 25:
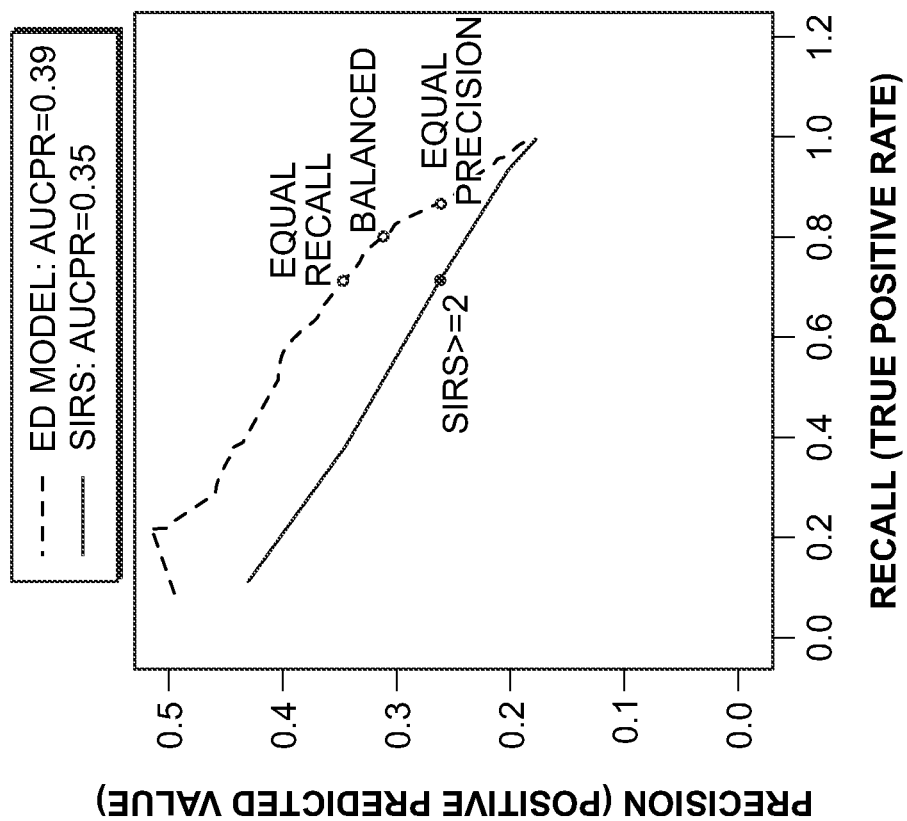
FIG. 25 illustrates a graph of precision recall of the exemplary vital sign model compared to the SIRS model.
Figure 24:
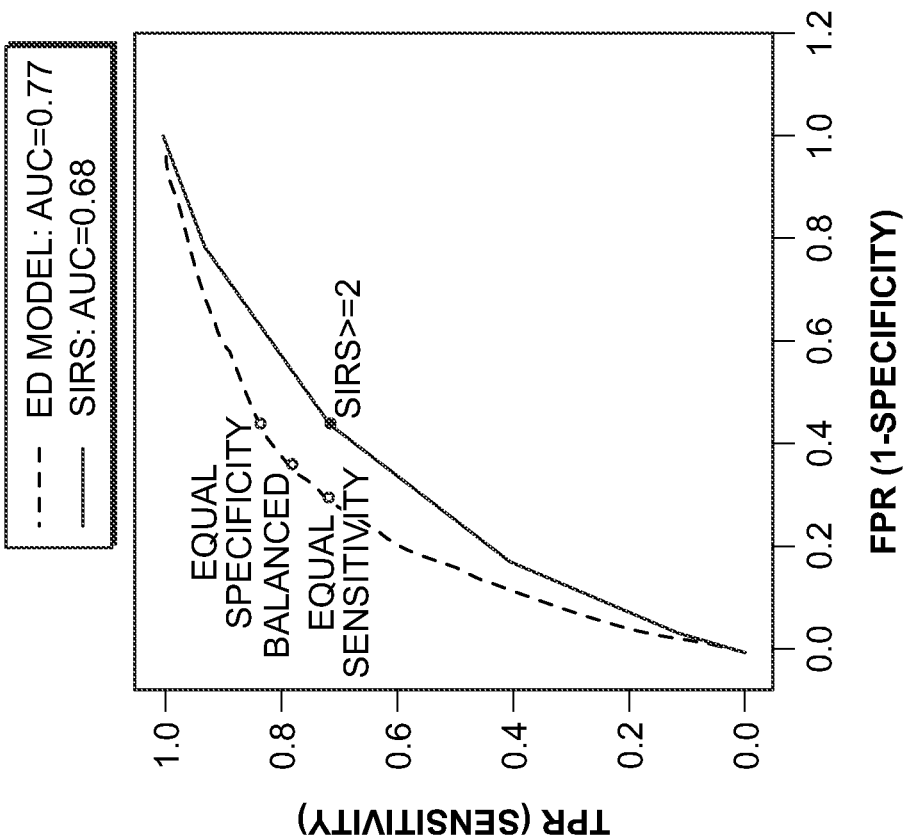
FIG. 24 illustrates a graph of operating characteristics of the exemplary vital sign model compared to the Systemic Inflammatory Response Syndrome (SIRS) model.
Figure 28:
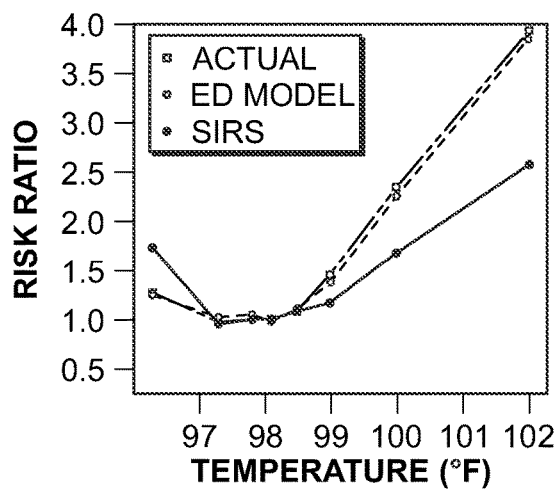
FIG. 28 illustrates a graph comparing actual risk ratios across octile bins of vital signs compared to risk ratios identified by the exemplary vital sign model and risk ratios identified by the SIRS model for temperature.
Figure 29:
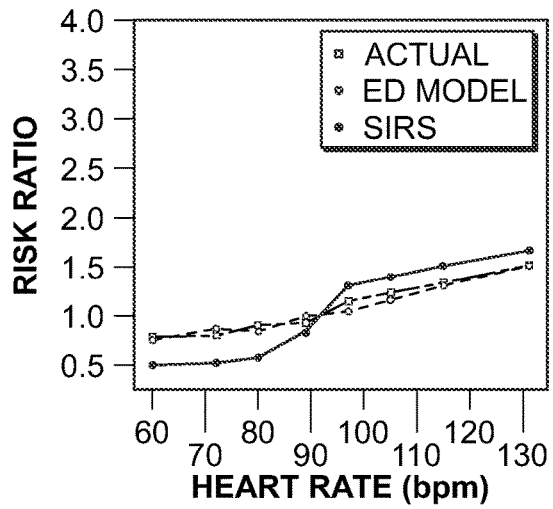
FIG. 29 illustrates a graph comparing actual risk ratios across octile bins of vital signs compared to risk ratios identified by the exemplary vital sign model and risk ratios identified by the SIRS model for heart rate.
Figure 30:
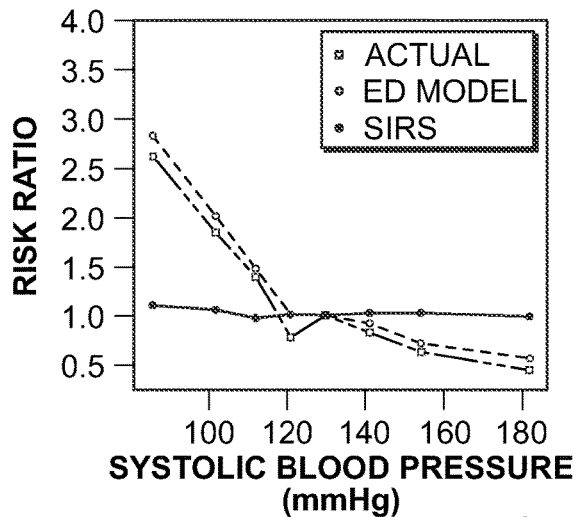
FIG. 30 illustrates a graph comparing actual risk ratios across octile bins of vital signs compared to risk ratios identified by the exemplary vital sign model and risk ratios identified by the SIRS model for systolic blood pressure.
Figure 31:
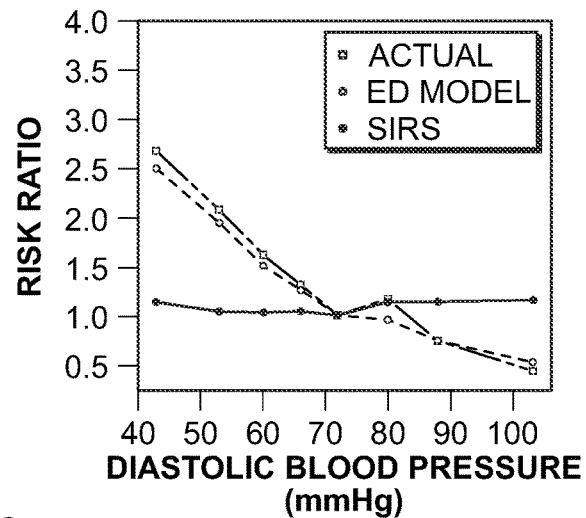
FIG. 31 illustrates a graph comparing actual risk ratios across octile bins of vital signs compared to risk ratios identified by the exemplary vital sign model and risk ratios identified by the SIRS model for diastolic blood pressure.
Figure 32:
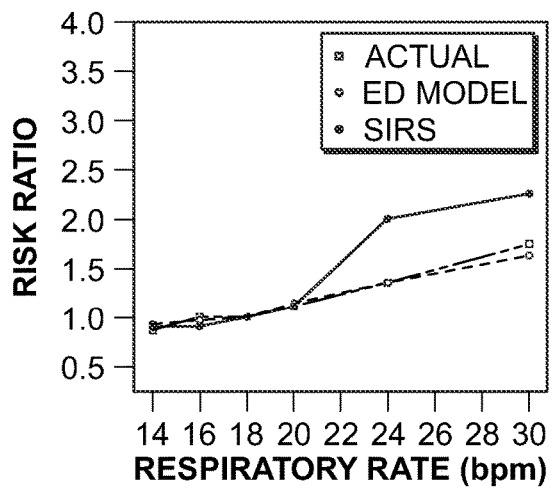
FIG. 32 illustrates a graph comparing actual risk ratios across octile bins of vital signs compared to risk ratios identified by the exemplary vital sign model and risk ratios identified by the SIRS model for respiratory rate.
Figure 33:
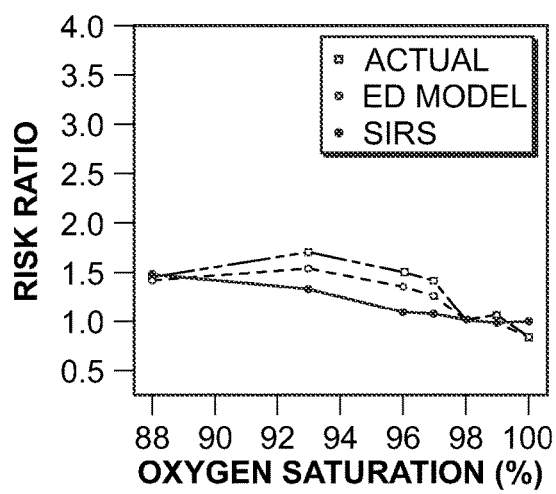
FIG. 33 illustrates a graph comparing actual risk ratios across octile bins of vital signs compared to risk ratios identified by the exemplary vital sign model and risk ratios identified by the SIRS model for oxygen saturation.
Figure 35:
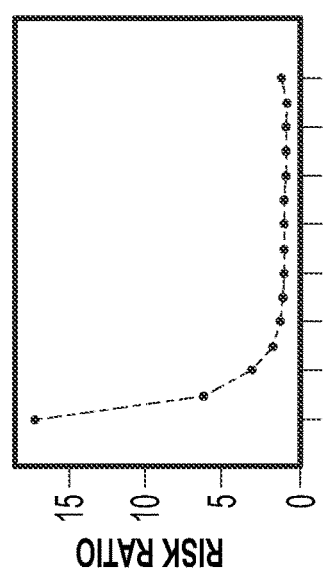
FIG. 35 illustrates a graph of risk ratio for both septic and non-septic patients in another intended target population of patients.
Figure 37:
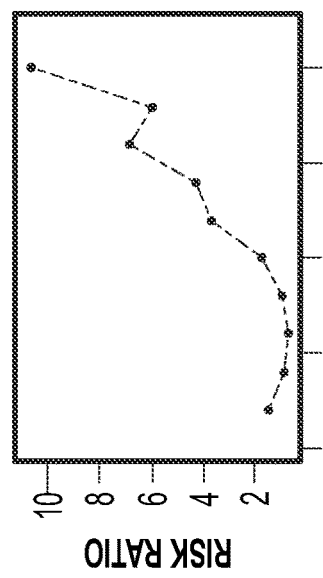
FIG. 37 illustrates a graph of another risk ratio for both septic and non-septic patients in the other target population of patients.
Figure 39:
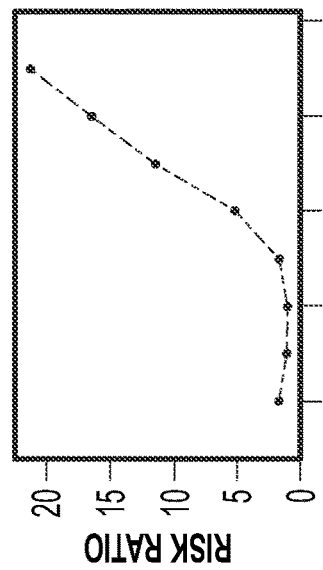
FIG. 39 illustrates a graph of another risk ratio for both septic and non-septic patients in the other target population of patients.
Figure 36:
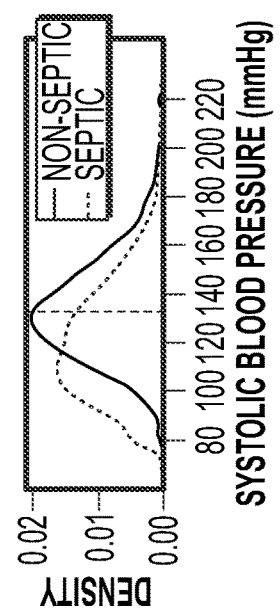
FIG. 36 illustrates a graph of density as a function of temperature for both septic and non-septic patients in the other target population of patients.
Figure 38:
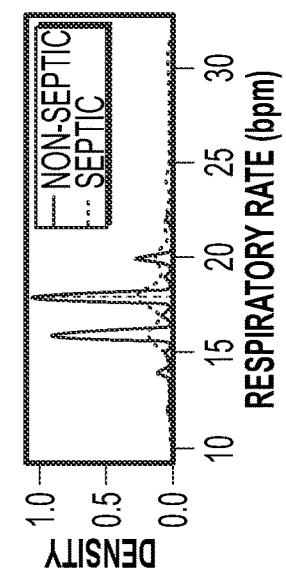
FIG. 38 illustrates a graph of density as a function of respiratory rate for both septic and non-septic patients in the other target population of patients.
Figure 40:
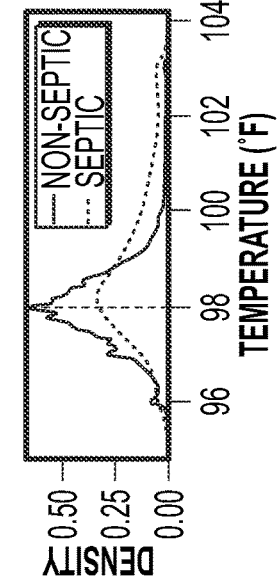
FIG. 40 illustrates a graph of density as a function of systolic blood pressure for both septic and non-septic patients in the other target population of patients.
Figure 41:
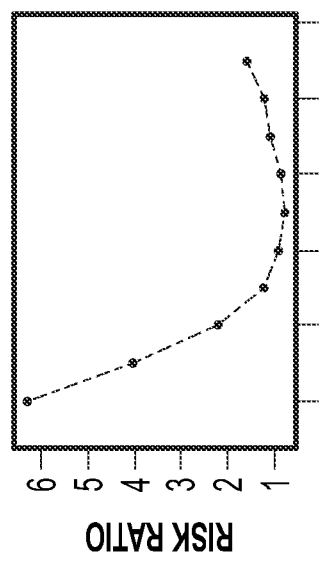
FIG. 41 illustrates a graph of another risk ratio for both septic and non-septic patients in the other target population of patients.
Figure 43:
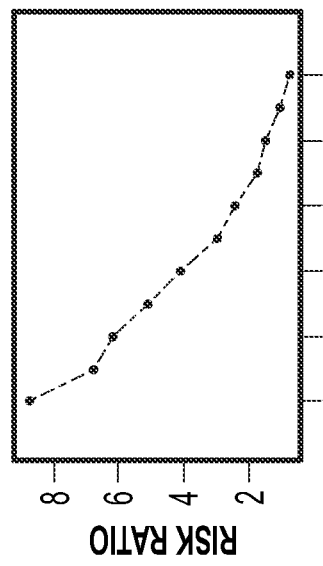
FIG. 43 illustrates a graph of another risk ratio for both septic and non-septic patients in the other target population of patients.
Figure 45:
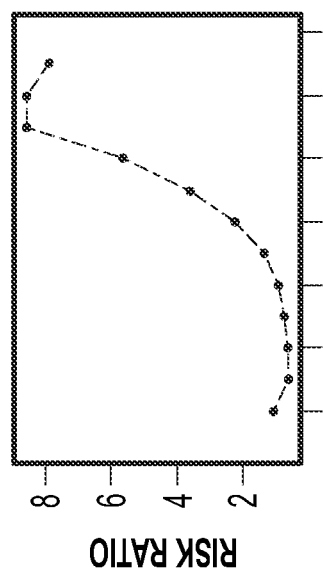
FIG. 45 illustrates a graph of another risk ratio for both septic and non-septic patients in the other target population of patients.
Figure 42:
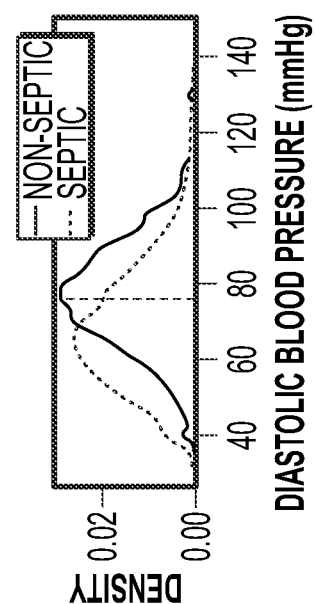
FIG. 42 illustrates a graph of density as a function of heart rate for both septic and non-septic patients in the other target population of patients.
Figure 44:
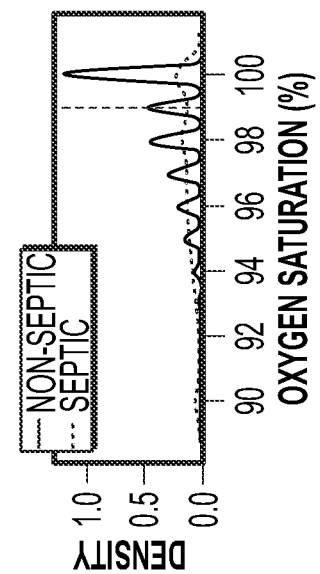
FIG. 44 illustrates a graph of density as a function of oxygen saturation for both septic and non-septic patients in the other target population of patients.
Figure 46:
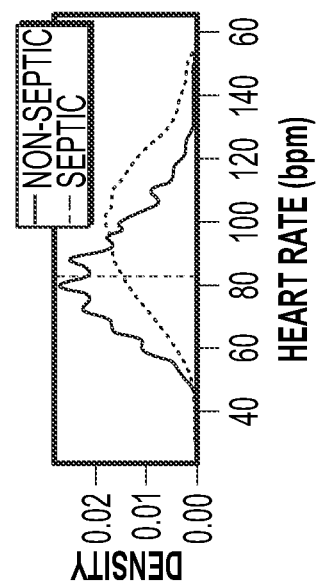
FIG. 46 illustrates a graph of density as a function of diastolic blood pressure for both septic and non-septic patients in the other target population of patients.

Referring to FIGS. 18-20, the vital sign model of the disclosed embodiments provides a gradient boosting machine model using vital signs from 400,000 emergency department admissions including nearly 10,000 sepsis ICD diagnoses. The vital sign model of the disclosed embodiments accurately recognizes subtle changes in vital signs and improves on SIRS in accuracy while eliminating the wait time associated with white blood cell lab results. Eliminating median time to white blood cell results, 80 min, from the sepsis bundle decision making process can lead to a drop in sepsis associated mortality of between 5% and 10%. The stability of the model was assessed by performing sensitivity analysis on subgroups. Consistent performance was found across age, gender, and all well-represented ethnicities.

The vital sign model of the disclosed embodiments is a machine learning model based on an adult patient cohort of 400,000 emergency department admissions (with nearly 10,000 cases of sepsis) and designed specifically to screen for sepsis at presentation to the emergency department. The vital sign model of the disclosed embodiments requires only a single set of vital signs, thus the model can be completed at emergency department triage. This prevents waiting for labs, such as the SIRS white blood cell count, which can lead to delays in treatment. The model of the disclosed embodiments is data-driven using a large emergency department triage dataset. The model evaluation criteria is specifically the ability to detect sepsis. Accordingly, the model is precise in comparison to a model designed for general deterioration.

Referring to FIGS. 18-19, the dataset used included MIMIC-IV-ED version 1.0, a publicly available dataset comprising 450,000 emergency department admissions to Beth Israel Deaconess Medical Center between 2011 and 2019. Emergency department triage vital signs were collected from the triage table. Sepsis diagnosis was collected from the diagnosis table. A text search was utilized to include descriptions with 'septis' or 'septic' and to specifically exclude descriptions with 'aseptic'. Linking to the data was performed via subject identification, hospital admission identification, and timestamp comparison. Additional antibiotics administration data was collected from the electronic medication administration record (EMAR) table. First time of antibiotic administration was defined as the earliest chart time. Lab results were collected. Demographics were collected from the patients and admissions tables. Sepsis diagnosis was also collected. Microbial cultures were further collected. Finally, ICU transfer was collected.

Emergency department triage vitals and labs were cleaned to remove implausible results outside the following bounds: temperature: [90, 105], heart rate: [0,200], respiratory rate: [0,60], o2sat: [70,100], sbp: [50, 250], dbp' [20, 200], WBC: [0, 50], Bands: [0, 50], pCO2: [0,100]. Labs were only considered if drawn within 4 hours of arrival to the emergency department, and only the first draw was used. Emergency department triage patient records with an incomplete set of vitals were excluded from analysis. Only adults 18 and older were included.

To build the model, the data set was split between 80% train and 20% validate by subsets randomized by subject identification. This avoided a scenario where a patient could be used to both train and validate. Additionally, the training set was split into 5 subsets randomized by subject identifications for training and testing purposes. A primary analysis assessed the accuracy of the model in a holdout validation set via area under the ROC curve. A secondary analysis compared the accuracy of the model to SIRS via sensitivity and specificity at fixed thresholds, namely equal sensitivity to SIRS, equal specificity to SIRS, and in between. For the secondary analysis comparison patients were excluded who did not have white blood cell drawn within 4 hours of emergency department admission. Finally, the stability of the model was assessed by performing sensitivity analysis on subgroups such as gender, ethnicity, and age to provide confidence that the screen provides consistent accuracy across various patient groups.

The MIMIC-IV-ED data set contained 448,972 emergency department admissions, among which 448,804 were adults. 413,309 adult admissions had a complete set of triage vitals, and thus were included in the study of the disclosed embodiments. The admission included 201,189 unique patients, some with multiple visits to the emergency department within the multiyear period. The admissions were balanced among gender and age. White, Latino, African American, Asian ethnicities were all well represented among the hospital admission, with between 7,000 and 125,000 per group.

FIG. 20 illustrates a table of median data for various degrees of sepsis. There were 9718 emergency department admissions with ICD diagnoses of sepsis, with a mortality rate of 12%, compared to a 1% mortality rate for non-septic emergency department admissions. Among those who died in the hospital, the median time to death was 9.5 days. 99.7% of septic patients were admitted from the emergency department to the hospital with a median length of stay (LOS) of 6.9 days. 53% of septic patients were admitted to the ICU with a median LOS of 2.5 days, versus 4% of non-septic patients with median LOS 1.8 days.

Figure 21:
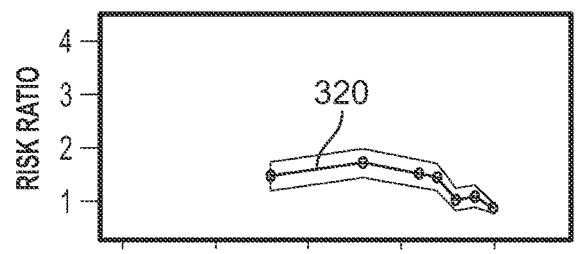
FIG. 21 illustrates a graph of another risk ratio for both septic and non-septic patients in the intended target population of patients.

FIG. 21 illustrates a table displaying rates at which procedures for preventing sepsis are administered. The recommended treatment of sepsis according to the surviving sepsis campaign is to first measure lactate, followed by microbial culture, and then broad-spectrum antibiotics and IV fluid, followed by vasopressors if necessary. 83% of septic patients had lactate drawn with a median time to draw of 56 minutes from emergency department registration. 99% of septic patients received a microbial culture, with a median time to draw of 51 minutes from emergency department registration. 88% of septic patients were administered antibiotics with median charted time of administration of 3.5 hours. Median time to hospital admission among septic patients was 4.8 hours, and among septic patients transferred to ICU, median time to ICU transfer was 6.9 hours.

In the United States, a major driving factor in the diagnosis of sepsis is the use of SIRS as a sepsis screen which includes 3 vital signs and 1 laboratory result, white blood cell count. 94% of septic patients had white blood cells drawn, with a median time of draw 44 minutes from emergency department admission and median time of result 80 minutes from emergency department admission, with 32% of septic patients receiving white blood cell count within 1 hour, and 98% within 4 hours. There is a positive association between time to white blood cell results and time to antibiotic administration. For every delay in 1 hour in white blood cell results, there was an associated 40 min delay in antibiotic treatment ($p<0.001$).

By comparison, triage vital signs were collected at a median time of 1 minute from emergency department admission, with 100% of septic patients receiving results within 1 hour. Exploratory analysis showed gradual increase in risk between physiological vital signs and sepsis. The leads to believe that there is room for improvement compared to SIRS which uses hard cutoffs for only 3 vital signs. For example, while SIRS assigns a 1 if the heart rate is above 90, the risk ratio among patients at 120 bpm is more than 6 times greater than baseline while the risk ratio among patients at 90 bpm is only 1.5 times greater than baseline.

The vital sign model of the disclosed embodiments uses only vital signs having an area under the curve of 0.85 when validated on patients held out from the training. When the vital sign model of the disclosed embodiments is applied to patients who had white blood cells drawn within 4 hours, a ROC-area under curve of 0.84 is realized compared to 0.78 for SIRS. When a cutoff threshold is assigned that corresponds to equal sensitivity as SIRS, a gain in specificity from 86% to 90% is realized. On the other hand if the cutoff threshold is set such that specificity is equal to SIRS, then sensitivity is increased from 58% to 64%.

When the model of the disclosed embodiments is tested across a range of vital sign values, the alert ratio holds close to the actual risk ratio across all values of vitals. Using heart rate as the example, patients with a heart rate in the 120's are 8 times more likely to be septic than a patient with a heart rate in the 80's. The vital sign model of the disclosed embodiments is 10 times more likely to alert for these patients. On the other hand the binary design of SIRS alerts 11 times more often for patients with heart rates in the 90's when the actual sepsis rate is only 1.5× higher. The SIRS heart rate alerting profile clearly resembles an above/below decision rather than a physio-pathological trend.

Additionally, the vital sign model of the disclosed embodiments shows consistent accuracy across patient demographic subgroups as well. Sensitivity and specificity by gender showed differences of only 1 percent. By age group sensitivity and specificity varied by up to 4 percentage points compared to overall. By ethnicity, sensitivity and specificity stayed consistently within 4 percentage points among White, Black/African American, Hispanic/Latino, and Asian as well as other and unknown categories.

The disclosed embodiments demonstrate that the performance of a vitals-only sepsis screen performs better than SIRS across more than 400,000 emergency department admissions at a single hospital. Estimates for increase in mortality due to delay in antibiotic administration range from 4% to 8% per hour. Using a simple model, if the median time to WBC result, 80 min, is subtracted from the sepsis bundle decision making process, there is a drop in mortality of between 5% and 10%. Given that 1141 septic patients died in the cohort between 2011 and 2019, this drop would lead to between 7 to 14 lives saved each year for this hospital alone. Using United States annual sepsis deaths of 270,000, it is expected to see between 14,500 and 27,000 lives saved annually in the United States. Vitals, labs, diagnoses, and most treatments were extracted for a large majority of the 450,000 emergency department admissions.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A vital signs monitor for detecting sepsis in a patient, the vital signs monitor comprising:
   a housing,
   at least one vital sign sensor coupled to the housing and configured to obtain at least one vital sign from a patient,
   a display on an outer surface of the housing, and
   a controller embedded in the housing and operable to receive a vital sign signal from the at least one vital sign sensor, the controller including a processor and a memory device, the memory device including a non-transitory portion storing instructions that, when executed by the processor, cause the controller to:
   acquire the vital sign signal from the at least one vital sign sensor,
   input the vital sign signal to a predefined vital sign model stored in the memory to establish a membership of risk indicated by the vital sign signal, wherein the vital sign is weighted by the model based on a range of another vital sign,
   determine a confidence interval for the membership,
   if the confidence is sufficient, automatically calculate a sepsis risk score for the patient, wherein the sepsis risk score is indicative of a risk level of the patient having sepsis, and
   display the sepsis risk score on the display.

2. The vital signs monitor of claim 1, wherein the predefined vital sign model is developed for an intended target population of patients.

3. The vital signs monitor of claim 2, wherein the intended target population of patients includes subgroups including at least one of a gender of the patient, an ethnicity of the patient, and an age of the patient.

4. The vital signs monitor of claim 2, wherein the intended target population of patients includes patients admitted to a predefined department of a healthcare facility.

5. The vital signs monitor of claim 4, wherein the predefined department of the healthcare facility includes the emergency department.

6. The system of vital signs monitor of claim 1, wherein the predefined vital sign model operates an algorithm that is trained using a clinical indication of sepsis as the outcome.

7. The vital signs monitor of claim 1, wherein the instructions, when executed by the processor, further cause the controller to perform a deterioration screen calculation to determine a deterioration risk level for the patient.

8. The vital signs monitor of claim 7, wherein the instructions, when executed by the processor, further cause the controller to display the deterioration risk level and a recommended clinical action on the display.

9. The vital signs monitor of claim 1, wherein the instructions, when executed by the processor, further cause the controller to activate an alert on the vital signs monitor based on the risk level of the patient having sepsis.

10. The vital signs monitor of claim 1, wherein the instructions, when executed by the processor, further cause the controller to display an individual vital sign of the at least one vital sign contributing to the sepsis risk score on the display.

11. The vital signs monitor of claim 10, wherein the instructions, when executed by the processor, further cause the controller to display a severity level of the individual vital sign of the at least one vital sign contributing to the sepsis risk score on the display.

12. The vital signs monitor of claim 11, wherein the instructions, when executed by the processor, further cause the controller to display a hospital protocol associated with the sepsis risk score on the display.

13. The vital signs monitor of claim 1, wherein the instructions, when executed by the processor, further cause the controller to accept a user supplied text file containing specifications for a user supplied model trained to detect deterioration in a target patient population using vital signs.

14. The vital signs monitor of claim 13, wherein the user supplied text file includes:
   a reference set of input vital signs that are applied to the user supplied model, and
   a reference set of output sepsis risk scores.

15. The vital signs monitor of claim 14, wherein the instructions, when executed by the processor, further cause the controller to determine if an actual set of computed sepsis risk scores using the user supplied model match the reference set of sepsis risk scores in the user supplied model.

16. The vital signs monitor of claim 15 wherein, if the actual set of computed sepsis risk scores using the user supplied model matches the reference set of sepsis risk scores in the user supplied model, the instructions, when executed by the processor, further cause the controller to activate the user supplied model as the predefined vital sign model for use in the vital signs monitor.

17. The vital signs monitor of claim 1, wherein the at least one vital sign includes at least one of a temperature of the patient, a heart rate of the patient, a systolic and diastolic blood pressure of the patient, a respiratory rate of the patient, and a blood oxygen saturation of the patient.

18. The vital signs monitor of claim 1, wherein the at least one vital sign includes a set of vital signs including at least two of a temperature of the patient, a heart rate of the patient, a systolic and diastolic blood pressure of the patient, a respiratory rate of the patient, and a blood oxygen saturation of the patient.

19. The vital signs monitor of claim 1, wherein the sepsis risk score is calculated using a single set of vital signs.

20. The vital signs monitor of claim 1, wherein the at least one vital sign sensor includes at least one of a blood pressure cuff, a thermometer, and a pulse oximeter.

* * * * *